(12) United States Patent
Leas

(10) Patent No.: US 10,224,798 B2
(45) Date of Patent: Mar. 5, 2019

(54) MAGNETIC SPIRAL BEVEL GEAR

(71) Applicant: Michael F. Leas, Los Osos, CA (US)

(72) Inventor: Michael F. Leas, Los Osos, CA (US)

( * ) Notice: Subject to any disclaimer, the term of this patent is extended or adjusted under 35 U.S.C. 154(b) by 230 days.

(21) Appl. No.: 15/191,270

(22) Filed: Jun. 23, 2016

(65) Prior Publication Data
US 2016/0380525 A1    Dec. 29, 2016

Related U.S. Application Data

(60) Provisional application No. 62/183,191, filed on Jun. 23, 2015.

(51) Int. Cl.
*H02K 49/10*    (2006.01)

(52) U.S. Cl.
CPC ................... *H02K 49/102* (2013.01)

(58) Field of Classification Search
CPC ...... H02K 49/06; H02K 49/10; H02K 49/102; H02K 51/00; H02K 7/10; F16H 49/00; F16H 25/20; F16H 25/24
See application file for complete search history.

(56) References Cited

U.S. PATENT DOCUMENTS

| | | | | |
|---|---|---|---|---|
| 5,899,320 A | * | 5/1999 | Miyasaka | B65G 13/04 198/789 |
| 6,411,001 B1 | | 6/2002 | Henderson | |
| 6,455,975 B1 | * | 9/2002 | Raad | H02K 7/125 310/152 |
| 6,705,174 B2 | | 3/2004 | Tippett | |
| 7,694,599 B2 | | 4/2010 | Brandl | |
| 8,288,904 B1 | * | 10/2012 | Bootsma, Jr. | H02K 49/102 310/103 |
| 8,346,131 B2 | | 1/2013 | Kim | |
| 9,467,036 B2 | * | 10/2016 | Bootsma, Jr. | H02K 49/10 310/103 |
| 2005/0161304 A1 | * | 7/2005 | Brandl | F16H 1/125 192/223 |

(Continued)

FOREIGN PATENT DOCUMENTS

| | | |
|---|---|---|
| DE | 3814455 | 11/1989 |
| WO | 0203530 | 1/2002 |
| WO | 2007010780 | 1/2007 |

OTHER PUBLICATIONS

Active Power; "Flywheel Technology Explained"; http://www.activepower.com/flywheel-technology; 2014; downloaded Jul. 25, 2016; 5 pages.

(Continued)

*Primary Examiner* — Tran Nguyen
(74) *Attorney, Agent, or Firm* — Fitch, Even, Tabin & Flannery LLP

(57) ABSTRACT

A magnetic spiral bevel gear including a frustoconical housing with a rotational axis and magnets arranged around an outer surface of the frustoconical housing. The magnets are arranged in spirals on the outer surface, with each spiral alternating polarity. Each may be formed by a single continuous magnet of by discrete magnets. Gear assemblies as disclosed including a two-gear assembly, a four-gear assembly, and a six-gear assembly. Gear assemblies are arranged such that the gear surfaces are parallel without touching, and rotation of one gear causes rotation of the remaining gears.

13 Claims, 18 Drawing Sheets

(56) References Cited

U.S. PATENT DOCUMENTS

| | | | | |
|---|---|---|---|---|
| 2006/0091748 | A1* | 5/2006 | Yoda | H02K 49/102 310/83 |
| 2008/0203831 | A1* | 8/2008 | French | H02K 51/00 310/46 |
| 2011/0266902 | A1 | 11/2011 | Whitfield | |
| 2013/0099615 | A1 | 4/2013 | Stewart | |
| 2014/0015362 | A1 | 1/2014 | Cheng | |
| 2014/0223901 | A1 | 8/2014 | Versteyhe | |

OTHER PUBLICATIONS

Calnetix; "Vycon Regen Kinetic Energy Recycling Systems"; https://www.calnetix.com/regen-kinetic-energy-storage-system; 2016; downloaded Jul. 25, 2016; 5 pages.

Leas; "The Magnevex VII Doing Work"; YouTube; https://www.youtube.com/watch?v=rSWE28gwsd8; published Jun. 8, 2014.

Li et al; "Comparison of Magnetic-Geared Permanent-Magnet Machines"; Progress in Electromagnetics Research, vol. 133; 2013; pp. 177-198.

MagnaDrive Corporation; "Vortex (VTX)"; http://www.magnadrive.com/vortex.aspx; 2016; downloaded Jul. 25, 2016; 2 pages.

Magnetic Technologies Ltd.; "Our Products"; http://www.magnetictech.com/our-products/; downloaded Jul. 25, 2016; 2 pages.

Magnomatics; "Magnetic Gears"; http://www.magnomatics.com/pages/technology/low-ration-magnetic-gears.htm; 2015; downloaded Jul. 25, 2016; 2 pages.

Metau Engineering; "Permanent Magnetic Coupling"; http://www.magnetic-coupling.it/photo-gallery/; downloaded Jul. 25, 2016; 2 pages.

Muruganandam et al.; "Design and Implementation of a Novel Magnetic Bevel Gear"; Control Engineering and Applied Informatics, vol. 15, No. 2,; 2013; pp. 30-37.

Owusu-Ansah et al.; "Review of Magnetic Flywheel Energy Storage Systems"; Research Journal of Applied Sciences, Engineering and Technology 8(5); Published Aug. 5, 2014; pp. 637-643.

The Oil Drum; "Energy Storage—Flywheel"; posted by Luis de Sousa on Oct. 5, 2011; http://www.theoildrum.com/node/8428; 31 pages.

Torotrak Group; "Flybird"; http://www.torotrak.com/products-partners/products/flybird/; downloaded Jul. 25, 2016; 2 pages.

Woodford; "How Do Flywheels Store Energy"; Explain That Stuff; http://www.explainthatstuff.com/flywheels.html; Jan. 4, 2016; 13 pages.

* cited by examiner

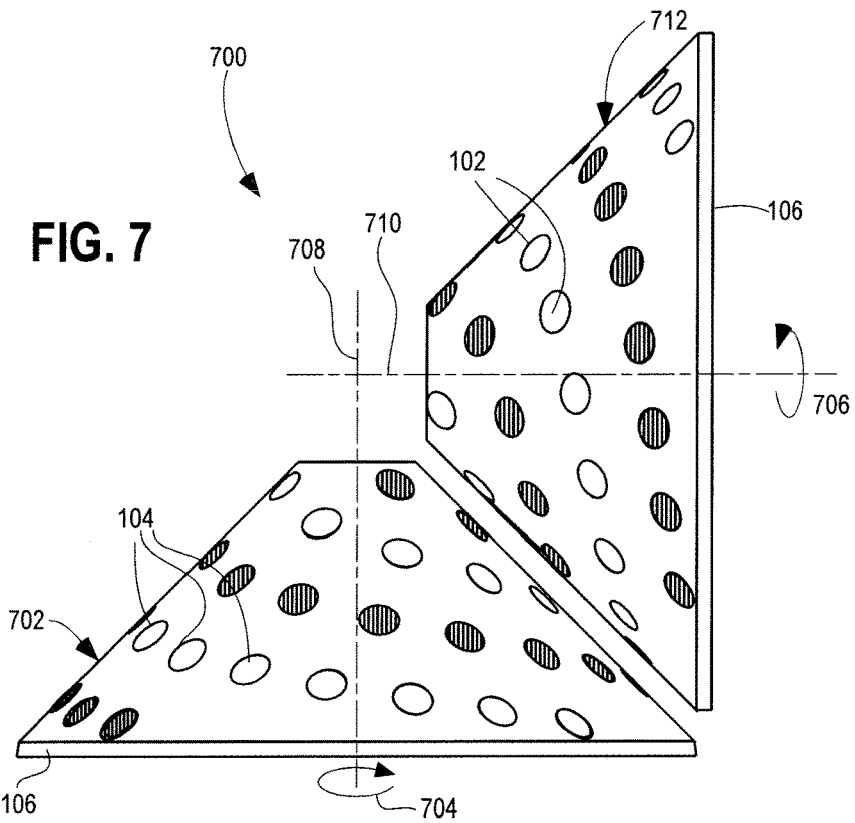
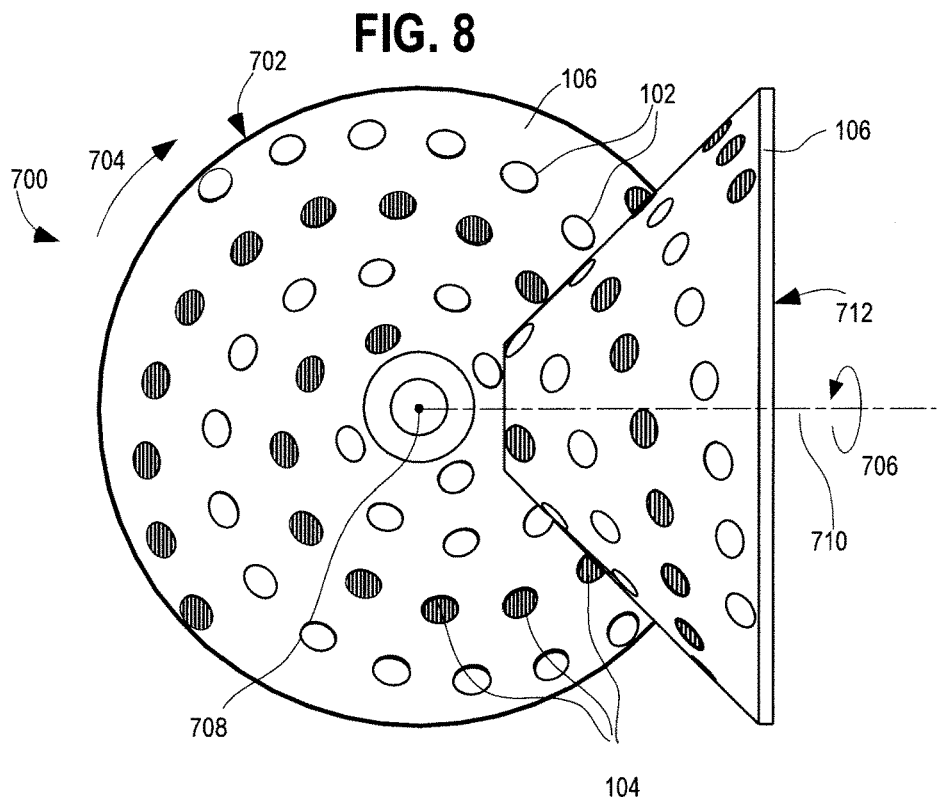

MAGNETIC SPIRAL BEVEL GEAR

This application claims the benefit of U.S. Provisional Application No. 62/183,191, filed Jun. 23, 2015, entitled MAGNETIC SPIRAL BEVEL GEAR, which is incorporated in its entirety herein by reference.

BACKGROUND OF THE INVENTION

1. Field of the Invention

The present invention relates generally to a magnetic drive apparatus, and more specifically to a magnetic gear apparatus.

2. Discussion of the Related Art

Known methods of transferring drive from engines and motors to gearboxes, pumps, alternators, generators and compressors can be accomplished by various forms of mechanical couplings such as pulley belts, chains, gears, discs, cogs and other couplings. Disadvantages of mechanical couplings include lubrication requirements, alignment requirements, wear and tear, energy loss, and friction.

Magnetic gears generally resemble traditional mechanical gears with the cogs of the mechanical gear replaced with magnets. Magnetic gears have advantages over mechanical gears, such as reduced maintenance, no lubrication needed, inherent anti-jamming transmission, allows for misalignment/vibration of shafts, and improved reliability.

Magnetic gears include at least two adjacent pairs of magnets coupled to the outer face of the gear, each pair of magnets rotating around an axis. Each pair of magnets is arranged such that north and south poles are alternated. In one common arrangement, a circular inner rotor is concentric with a tubular outer rotor. Typically the inner rotor and the outer rotor are separated by a circular set of stationary pole pieces interposed between the inner rotor and the outer rotor.

In typical operation, magnetic gears operate with the magnetic poles of the magnets coupled to the face of one magnetic gear "pulling" the poles coupled to the face of a proximate magnetic gear. Types of magnetic gear combinations known in the art include planetary gears, bevel gears, and worm gears.

SUMMARY OF THE INVENTION

Several embodiments of the invention advantageously address the needs above as well as other needs by providing A magnetic gear comprising: a housing having a frustoconical shape, wherein an outer side surface of the frustoconical shape has a constant slope, the housing having a rotational axis coinciding with a rotational axis of the frustoconical shape; at least one north-oriented magnetic spiral coupled to the frustoconical shape, each north-oriented magnetic spiral comprising at least one magnet with the north pole facing generally outwards from the side surface, wherein each north-oriented magnetic spiral follows a spiral path on the side surface, wherein each spiral path starts at a start point located at a first radius from the rotational axis and proximate to a top of the frustoconical shape and continues in a spiral geometry on the side surface until an end point location at a second radius from the rotational axis and proximate to a base of the frustoconical shape; and at least one south-oriented magnetic spiral coupled to the frustoconical shape, each south-oriented magnetic spiral comprising at least one magnet with the south pole facing generally outwards from the side surface, wherein each south-oriented magnetic spiral follows the spiral path on the side surface, wherein the at least one north-oriented magnetic spiral and the at least one south-oriented magnetic spiral are equally spaced with respect to a perimeter of the frustoconical shape, wherein the magnetic spirals alternate between north-oriented magnetic spirals and south-oriented magnetic spirals, wherein north-oriented magnetic spirals and south-oriented magnetic spirals do not touch, and wherein a total number of magnetic spirals is an even number.

In another embodiment, the invention can be characterized as a magnetic gear assembly comprising: a plurality of magnetic gears, each magnetic gear comprising: a housing having a frustoconical shape, wherein an outer side surface of the frustoconical shape has a constant slope, the housing having a rotational axis coinciding with a rotational axis of the frustoconical shape; at least one north-oriented magnetic spiral coupled to the frustoconical shape, each north-oriented magnetic spiral comprising at least one magnet with the north pole facing generally outwards from the side surface, wherein each north-oriented magnetic spiral follows a spiral path on the side surface, wherein each spiral path starts at a start point located at a first radius from the rotational axis and proximate to a top of the frustoconical shape and continues in a spiral geometry on the side surface until an end point location at a second radius from the rotational axis and proximate to a base of the frustoconical shape; and at least one south-oriented magnetic spiral coupled to the frustoconical shape, each south-oriented magnetic spiral comprising at least one magnet with the south pole facing generally outwards from the side surface, wherein each south-oriented magnetic spiral follows the spiral path on the side surface, wherein the at least one north-oriented magnetic spiral and the at least one south-oriented magnetic spiral are equally spaced with respect to a perimeter of the frustoconical shape, wherein the magnetic spirals alternate between north-oriented magnetic spirals and south-oriented magnetic spirals, wherein each magnetic gear includes the same number of magnetic spirals, wherein each magnetic gear includes the same spiral geometry, wherein each magnetic gear is oriented with the rotational axis perpendicular to at least one different magnetic gear, wherein adjacent magnetic gears are oriented such that the side surfaces of the adjacent gears are parallel to each other without the adjacent magnetic gears touching and, whereby rotation of a first mechanical gear included in the mechanical gear assembly causes rotation of the remainder of the mechanical gears as a result of interaction between the magnetic spirals of adjacent mechanical gears.

BRIEF DESCRIPTION OF THE DRAWINGS

The above and other aspects, features and advantages of several embodiments of the present invention will be more apparent from the following more particular description thereof, presented in conjunction with the following drawings.

FIG. 7 is a front elevational view of a first two-gear assembly in yet another embodiment of the present invention.

FIG. 8 is a top view of the first two-gear assembly.

Figure 1:
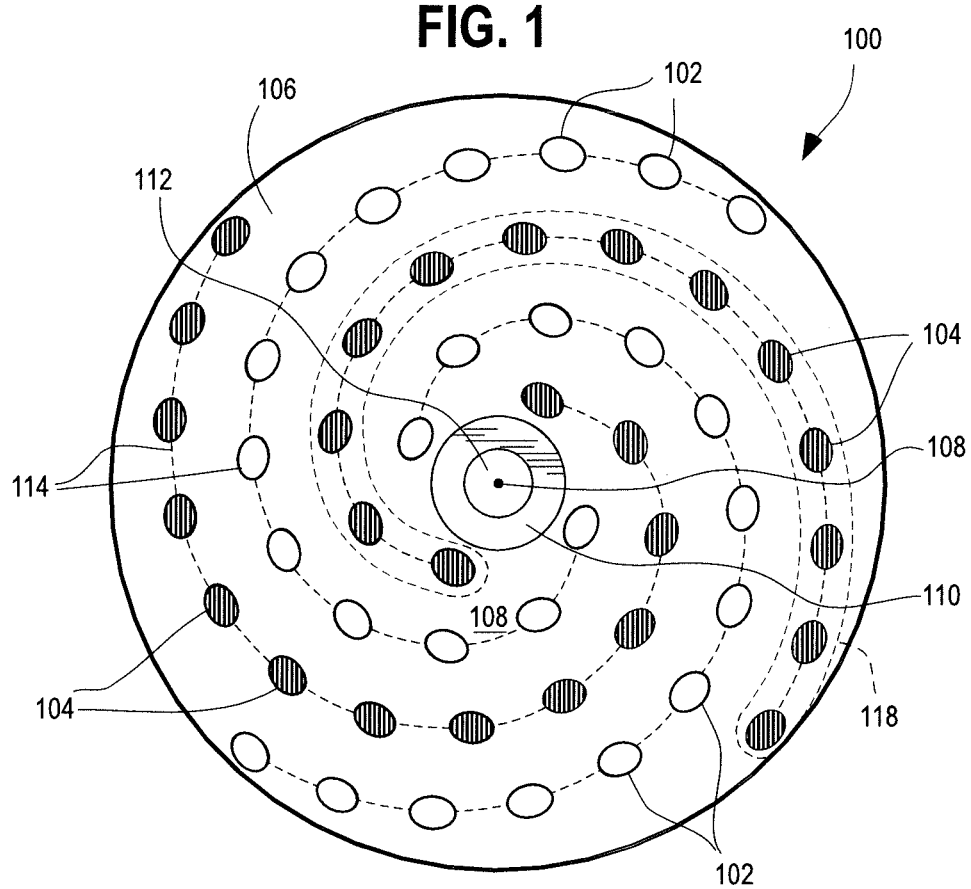
FIG. 1 is a front elevational view of a discrete magnetic spiral bevel gear in a first embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
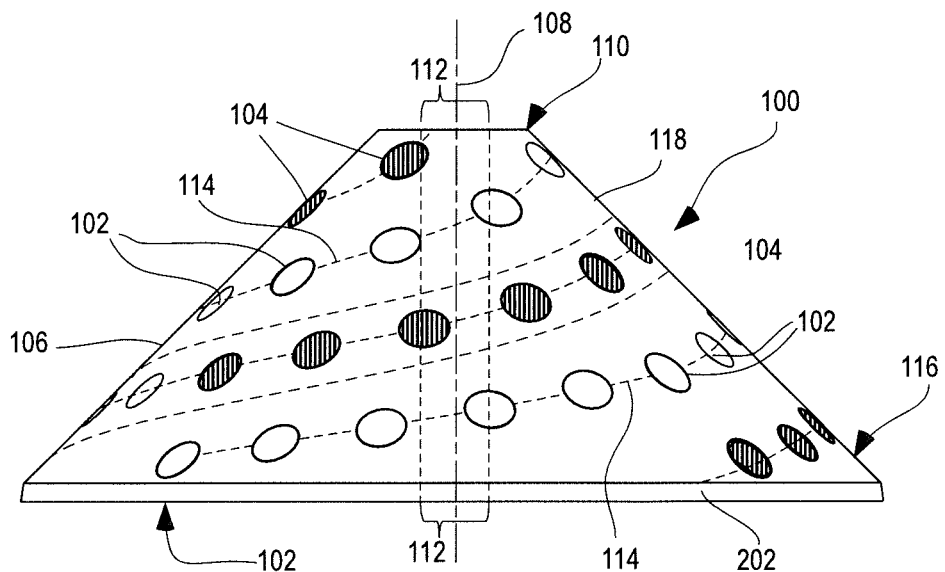
FIG. 2 is a top view of the discrete magnetic spiral bevel gear.

Referring first to FIGS. 1 and 2, a front elevational view and a top view, respectively, of a discrete magnetic spiral bevel gear 100 in a first embodiment of the present invention is shown. Shown are a plurality of north-oriented discrete magnets 102, a plurality of south-oriented discrete magnets 104, a housing 106, a rotational axis 108, a top surface 110, a bore 112, a plurality of spiral paths 114, a frustoconical surface 116, a plurality of magnetic spirals 118, a bottom surface 200, and a cylindrical collar 202.

The discrete magnetic spiral bevel gear 100 comprises the housing 106 having a general frustoconical (truncated cone) shape with the rotational axis 108 of the housing 106 coincident with the rotational axis 108 (the rotational axis 108 coincident with a longitudinal axis of the frustoconical shape) of the frustoconical housing 106. The housing 106 includes the outer side surface, typically referred to as the frustoconical surface 116. The housing 106 in the embodiment shown includes the central bore 112 configured to receive a shaft for coupling the discrete magnetic spiral bevel gear 100 to the shaft. It will be understood that depending on the method of utilization of one discrete magnetic spiral bevel gear 100, the discrete magnetic spiral bevel gear 100 may have no bore or alternatively may include an indentation that does not pass completely through the discrete magnetic spiral bevel gear 100.

The housing 106 in the present embodiment also includes the optional cylindrical collar 202 juxtaposed with a base of the frustoconical shape. The collar 202 is optional and may be included for machining purposes. The angle (slope) of the frustoconical surface 116 is typically 45 degrees to allow multiple magnetic spiral bevel gears to mesh with each other simultaneously, but other surface angles may also be used for assemblies with fewer gears.

The discrete magnetic spiral bevel gear 100 in the first embodiment includes the magnetic spirals 118, each magnetic spiral 118 comprising a plurality of discrete solid bar permanent discrete magnets 102, 104 with one face of each discrete magnet coupled to the angled frustoconical surface 116 of the housing 106. The discrete magnets 102, 104 comprising each magnetic spiral 118 are spaced along one of the spiral paths 114, each spiral path 114 extending from proximate to the top surface 110 to proximate to the base of the frustoconical shape, with each spiral path 114 widening as the spiral path 114 continues from the top surface 110 to the bottom end of the frustoconical surface 116. The discrete magnets (or continuous magnets as shown below in FIGS. 3 and 4) are sized and the magnetic spirals 118 are spaced such that magnets in one magnetic spiral 118 do not contact magnets in adjacent magnetic spirals 118. In the exemplary discrete magnetic spiral bevel gear 100 of FIGS. 1 and 2 the spiral paths 114 are oriented clockwise (i.e. the magnetic spiral bevel gear is termed a clockwise gear. The terms "clockwise gear" and "counterclockwise gear" define the direction of the magnetic spirals 118, not the rotational direction of the gear during operation). A clockwise gear may rotate in either rotational direction about the rotational axis 108, depending on the rotational direction of adjacent gears in a gear assembly. Magnetic spiral bevel gear assemblies comprising multiple magnetic spiral bevel gears in magnetic contact typically include both clockwise gears and counterclockwise gears. Each discrete magnetic spiral bevel gear 100 includes an even number of magnetic spirals 118 (e.g. 2, 4, 6, etc.) In the embodiment shown in FIGS. 1 and 2, four magnetic spirals 118 are shown. The magnetic spirals 118 are evenly spaced around the perimeter of the discrete magnetic spiral bevel gear 100. In the embodiment shown, each magnetic spiral 118 extends at least ¾ of the way around the perimeter of the frustoconical surface 116.

In one embodiment each spiral path 114 is a square root spiral as shown below in FIG. 5. In another embodiment each spiral path 114 is a fractal spiral as shown below in FIG. 6. Other spiral geometries may also be used.

Each magnetic spiral 118 includes the plurality of equally-spaced discrete magnets oriented with an opposite polarity facing outward as compared to the adjacent spirals, i.e. the magnetic spirals 118 alternate polarity, as shown by the magnetic spirals 118 including north-oriented discrete magnets 102 (indicating that "North" polarity is outwards) and the magnetic spirals 118 including south-oriented discrete magnets 104 (indicating "South" polarity is outwards). In the embodiment shown, the discrete magnets 102, 104 are coupled to the gear such that the magnetic pole of each magnet is perpendicular to the frustoconical surface 116 of the housing 106 and an outer surface of the magnet is generally aligned with the sloped surface 116. In other embodiments, the magnets may extend past the frustoconical surface 116. In one embodiment the spacing of the magnets in each spiral path 114 is less than the distance between adjacent spiral paths 114.

Figure 3:
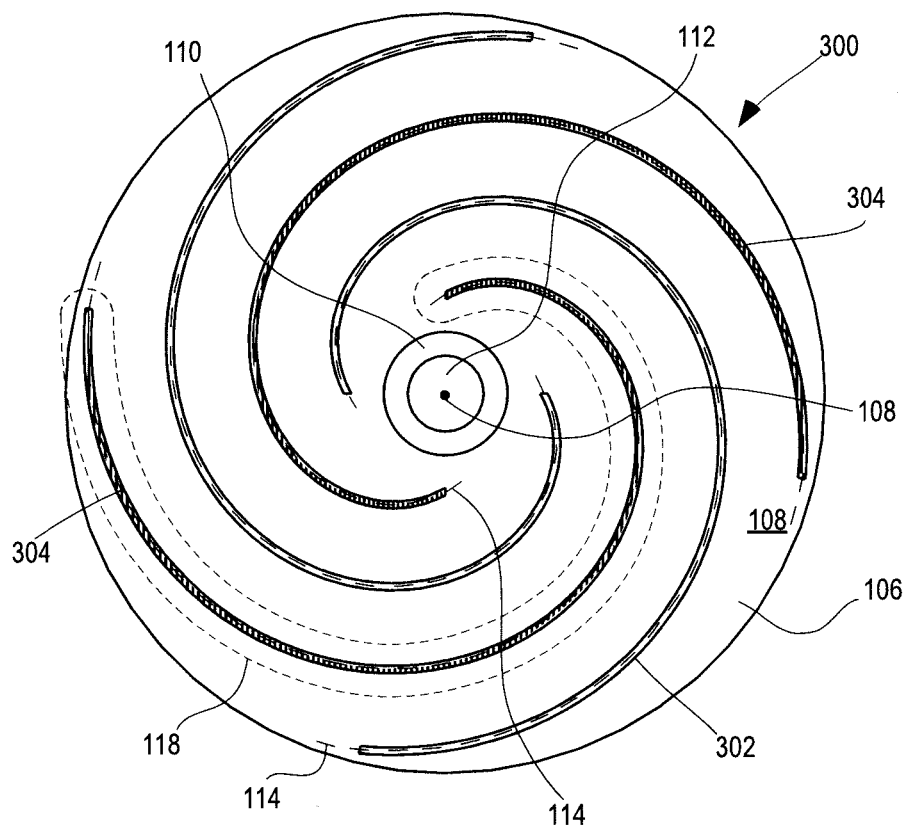
FIG. 3 is a front elevational view of a continuous magnetic spiral bevel gear in another embodiment of the present invention.
Figure 4:
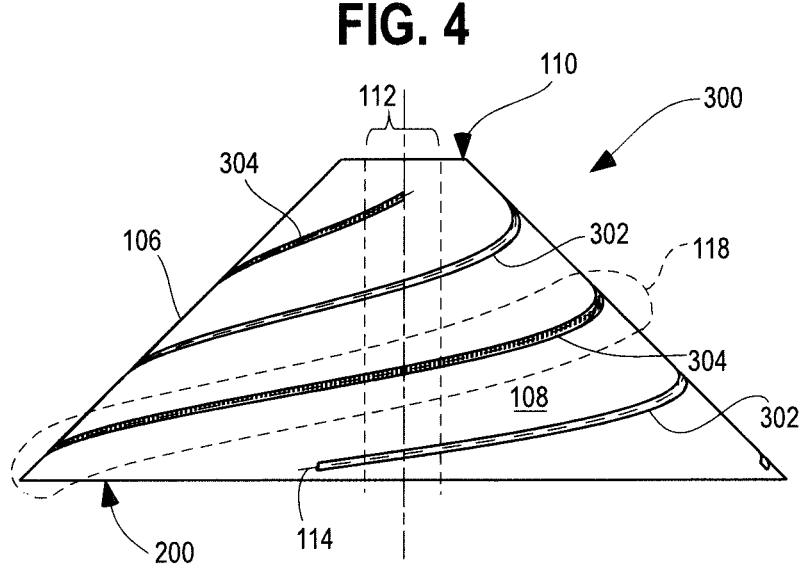
FIG. 4 is a top view of the continuous magnetic spiral bevel gear.

Referring next to FIGS. 3 and 4, a front elevational view and a top view, respectively, of a continuous magnetic spiral bevel gear 300 is shown in a second embodiment of the present invention. Shown are the housing 106, the rotational axis 108, the top surface 110, the bore 112, the plurality of spiral paths 114, the frustoconical surface 116, the magnetic spirals 118, the bottom surface 200, a cylindrical collar 202, a plurality of north-oriented strip magnets 302, and a plurality of south-oriented strip magnets 304.

The continuous magnetic spiral bevel gear 300 is shaped similarly to the discrete magnetic spiral bevel gear 100, i.e. the continuous magnetic spiral bevel gear 300 comprises the generally frustoconical housing 106 including the central bore 112. The continuous magnetic spiral bevel gear 300 as shown in FIGS. 3 and 4 does not include the cylindrical collar 202 as shown in FIGS. 1 and 2, but it will be understood that the cylindrical collar 202 or other general shape modifications may be included as long as the shape modifications do not affect the general operation of the continuous magnetic spiral bevel gear 300.

The continuous magnetic spiral bevel gear 300 includes the magnetic spirals 118, each magnetic spiral 118 comprising one continuous solid strip magnet 302, 304 following the spiral path 114 instead of the discrete magnets 102, 104 spaced along the spiral path 114. A width of the solid strip magnet 302, 304 is determined by the end usage requirements. A narrower width of the solid strip magnet 302, 304 provides less magnetic coupling strength. A wider width of the solid strip magnet 302, 304 provides greater magnetic coupling strength, giving a greater EMF contact point, which may result in magnetic oversaturation if the magnetic fields are too close, not allowing magnetic fields to interact. As with the discrete magnetic spiral bevel gear 100, the continuous strip magnets 302, 304 are typically coupled to the continuous magnetic spiral bevel gear 300 such that the magnetic pole of each magnet is perpendicular to the sloped face of the continuous magnetic spiral bevel gear 300 and an outer surface of the strip magnet 302, 304 is generally aligned with the sloped surface 116. In other embodiments, the magnetic pole of each strip magnet 302, 304 may be at an angle other than perpendicular to the sloped surface 116. In other embodiments, the outer surface of the strip magnet 302, 304 extends past the sloped surface 116. As with the discrete magnetic spiral bevel gear 100, the continuous magnetic spiral bevel gear 300 embodiment also includes four magnetic spirals 118, with alternating North and South polarities, although as previously noted, other even numbers of magnetic spirals 118 can be used.

Figure 5:
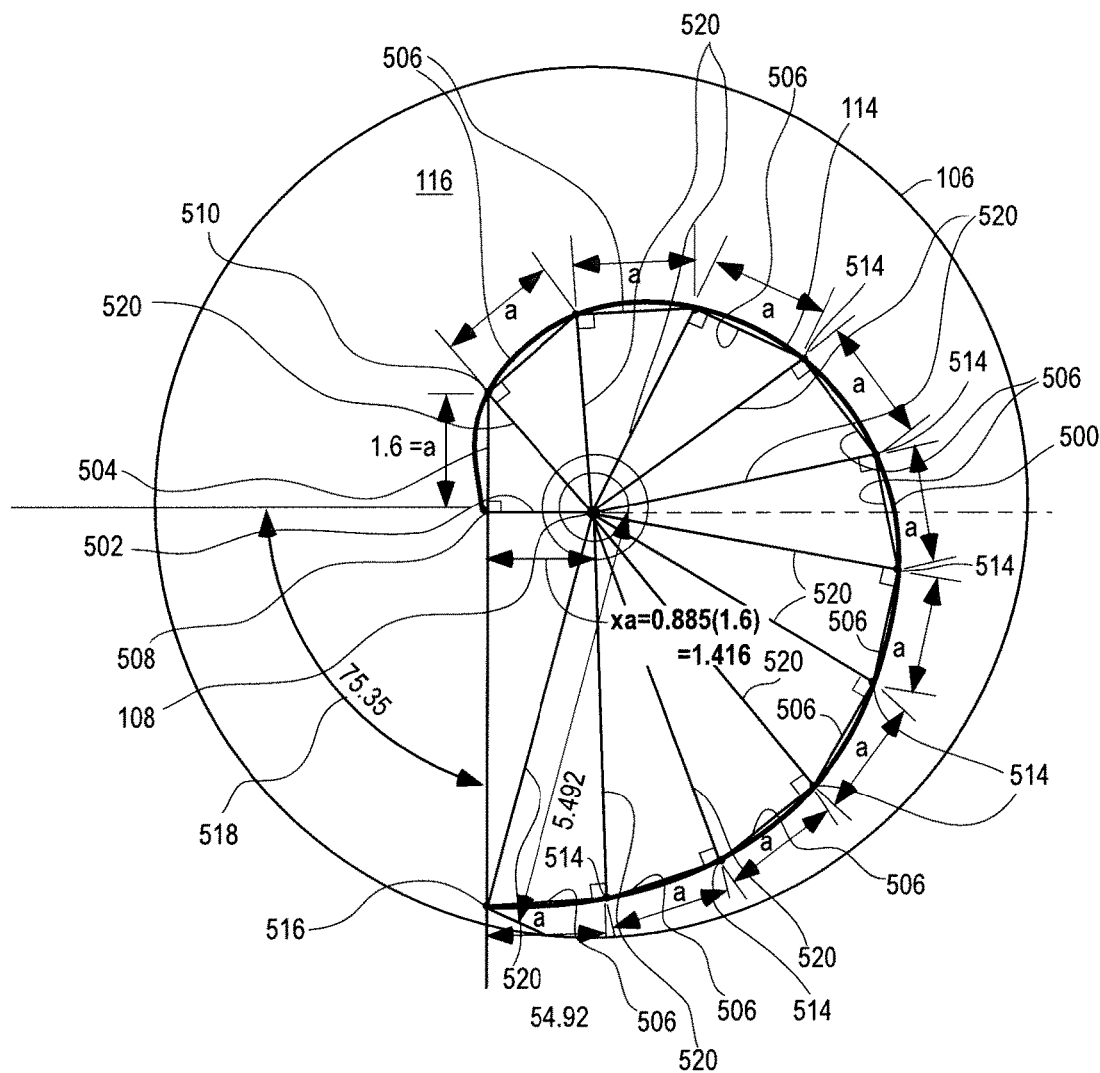
FIG. 5 is a top view of a housing including a first spiral path.

Referring next to FIG. 5, a top view of the housing 106 including a first spiral path 500 is shown. Shown are the rotational axis 108, the spiral path 114, the frustoconical surface 116, the housing 106, the first spiral path 500, a first leg 502, a second leg 504, a plurality of outer legs 506, a start point 508, a second point 510, a third point 512, additional points 514, a last point 516, an angle 518, and a plurality of inner legs 520.

As previously described, each magnetic spiral 118 follows one spiral path 114 around the outer frustoconical surface 116 of the frustoconical housing 106. In one embodiment, the geometry of the spiral path 114 is defined by a root spiral geometry as described in FIG. 5. The first spiral path 500 is defined on a top view of the frustoconical housing 106. It will be understood that while the geometry is shown in a plan view, the actual spiral geometry will follow the frustoconical surface 116 of the housing 106 in three dimensions. The start point 508 of the first spiral path 500, proximate to the tip of the frustoconical shape, is located at a point defined by a radius equal to x*a from the rotational axis 108, where x and a are constants. The first leg 502 is the straight line joining the rotational axis 108 to the start point 508, and has a length equal to x*a. The second leg 504 starts at an outer end of the first leg 502 (i.e. x*a from the rotational axis 108) and extends perpendicularly a length equal to a. And end of the second leg 504 distal to the first leg 502 is the second point 510. A first hypotenuse joining the first leg 502 to the second leg 504 (i.e. the second point to the rotational axis 108) forms a right triangle. The first hypotenuse then becomes a leg for the next right triangle formed by the first hypotenuse (now a leg), a perpendicular line with a length a and extending away from the first right triangle and ending in the third point 512, and a new hypotenuse connecting the two legs. Additional points 514 on the first spiral path 500 are sequentially determined in this manner until the last point 516 is reached. The curving spiral path 114 is then fit to the plurality of points.

In the example shown in FIG. 5, a=1.6 and x=0.885. The first leg 502 is therefore x*a=0.885*1.6=1.416. Twelve points of the first spiral path 500 are defined, with the last point 516 at a distance 5.492 from the rotational axis 108 and at the angle 518 with a value of 75.35 degrees from the first leg 502. Other values of x and a may be used, for example a=0.75 and x=0.9.

With the spiral path 500 shown in FIG. 5, the length of the inner leg 520 stays true to within a few decimal places to being a growing fraction by the next odd integer over its previous even. This pattern of growth was approached with fair accuracy and came from using typical root spiral constraints where the outer leg 506 distance remained fixed, driving the dimension of the next radial distance, as the hypotenuse of the previous becomes the leg of the next.

Figure 6:
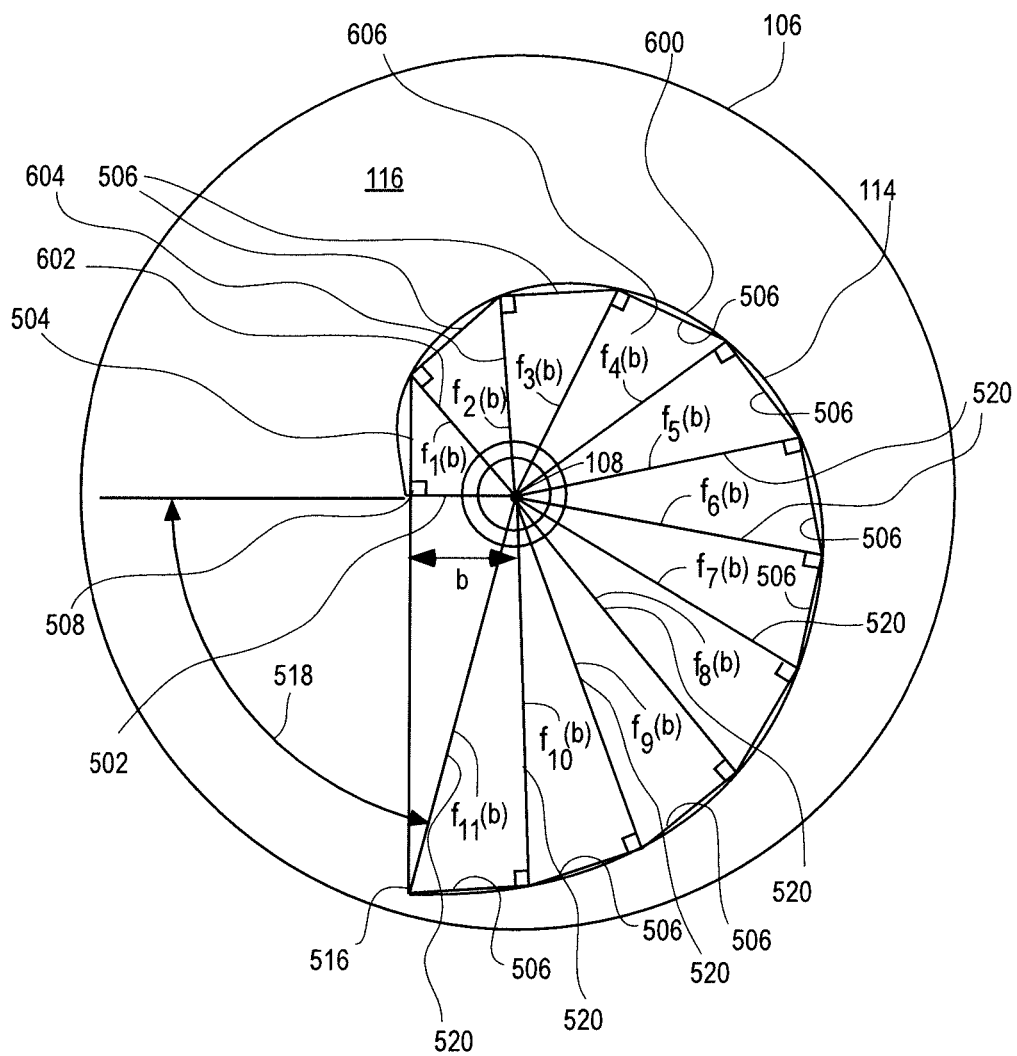
FIG. 6 is a top view of a housing including a second spiral path.

Referring next to FIG. 6, a top view of the housing 106 including a second spiral path 600 is shown. Shown are the rotational axis 108, the spiral path 114, the frustoconical surface 116, the housing 106, the second spiral path 600, the first leg 502, the second leg 504, the plurality of outer legs 506, the start point 508, the second point 510, the third point 512, additional points 514, the last point 516, the angle 518, the plurality of inner legs 520, a second inner leg 602, a third inner leg 604, and a fourth inner leg 606.

In another embodiment, the second spiral path 600 is defined in a similar manner to the first spiral path 500, by defining right triangles and using the hypotenuse of each triangle as a leg of the next triangle. The second spiral path 600 is defined by a fractal geometry. For the second spiral path 600, the first point is defined at a distance b from the rotational axis 108, i.e. the first leg 502 is length b. The second inner leg 602 (the first hypotenuse) is defined by the equation b*3/2=1.5b. The first outer leg (the second leg 504) of the first right triangle can then be determined using the first leg 502 and the first hypotenuse. The third inner leg 604 is equal to the previous inner leg multiplied by the ration of the next two integers: (1.5b)*(5/4)=1.875b. The fourth inner leg 606 is equal to 1.875b*(7/6)=2.1875b, etc. The outer legs 506 are determined using the lengths of the inner leg 520 and the hypotenuse of each triangle. Using only right triangles, the only constraint needed is that the inner leg 520 length extends by this pattern of fractal growth, driving the dimension of the outer leg 506, which remains fairly true throughout the spiral.

In one numerical example as illustrated in FIG. 6, b=0.667, resulting in the second leg=1.00, the third leg=1.25, the fourth leg=1.641, and so on until at the last point 516 the last leg=2.579.

Referring next to FIGS. 7 and 8, an elevational view and a top view, respectively, of a first two-gear assembly 700 is shown in one embodiment of the present invention. Shown are two housings 106, the plurality of north-oriented discrete magnets 102, the plurality of south-oriented discrete magnets 104, a first discrete magnetic spiral bevel gear 702, a second discrete magnetic spiral bevel gear 712, a first gear rotational direction 704, a second gear rotational direction 706, a first gear rotational axis 708, and a second gear rotational axis 710.

In the first two-gear assembly 700, two generally mirror-imaged discrete magnetic spiral bevel gears 100 (i.e. the magnetic spirals 118 are in opposing directions, with one clockwise spiral and one counterclockwise spiral) are arranged in a conventional bevel gear arrangement, with the rotational axes 708, 710 perpendicular and the interacting sloped faces 116 parallel and separated by a distance, i.e. the first discrete magnetic spiral bevel gear 702 does not touch the second discrete magnetic spiral bevel gear 712. The distance is dependent on the desired degree of magnetic coupling for the specific system. In the present embodiment, the distance is approximately ³⁄₁₆". In the embodiment shown, the first discrete magnetic spiral bevel gear 702 is a counterclockwise gear and the second discrete magnetic spiral bevel gear 712 is a clockwise gear. For clarity, mechanical supports (such as a drive shaft) for the bevel gears are not shown, but it will be understood that each gear is supported for free rotation about its rotational axis 708, 710. When one gear is mechanically rotated, the interaction between the magnets of the two gears rotates the other gear in the assembly around its rotational axis 708, 710. In the example of FIGS. 7 and 8, the spiral paths 114 of the gears are mirror images, resulting in an opposite direction of rotation of the other gear. For example, as shown in FIGS. 7 and 8, if the first gear 702 is mechanically rotated in the clockwise first gear rotational direction 704, the magnetic interaction between the magnet of the first discrete magnetic spiral bevel gear 702 and the second discrete magnetic spiral bevel gear 712 will cause rotation of the second gear 712 in the counterclockwise second gear rotational direction 706.

Figure 9:
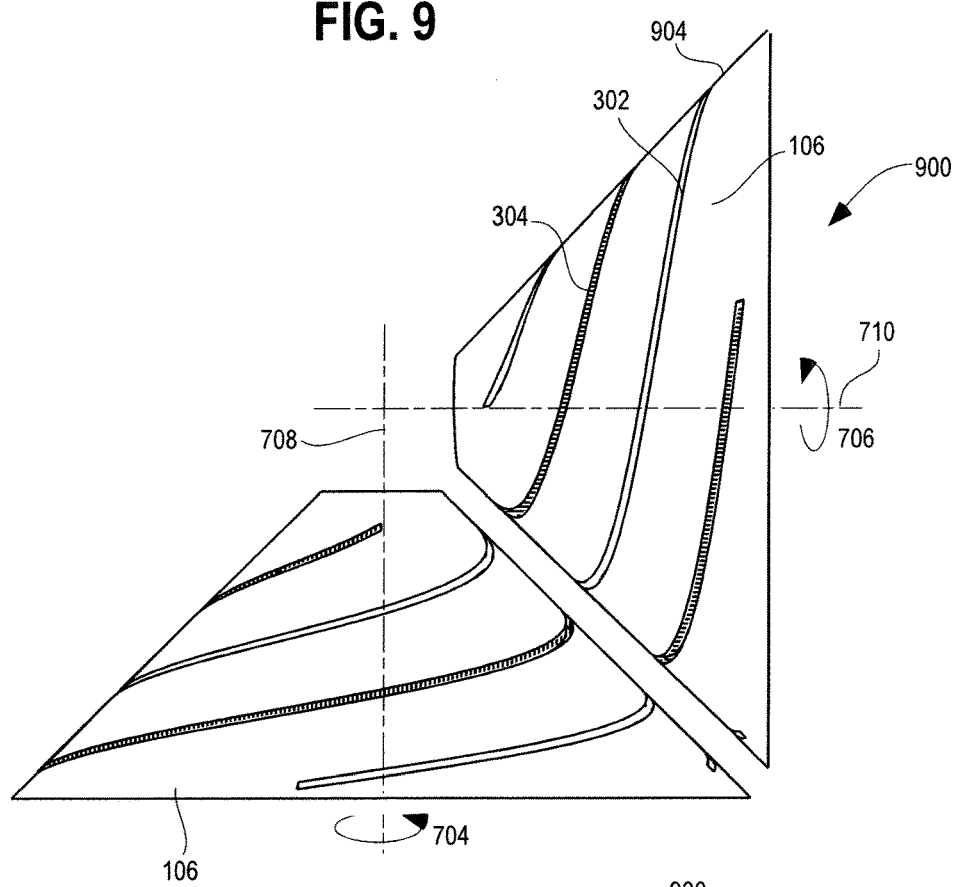
FIG. 9 is a front elevational view of a second two-gear assembly.
Figure 10:
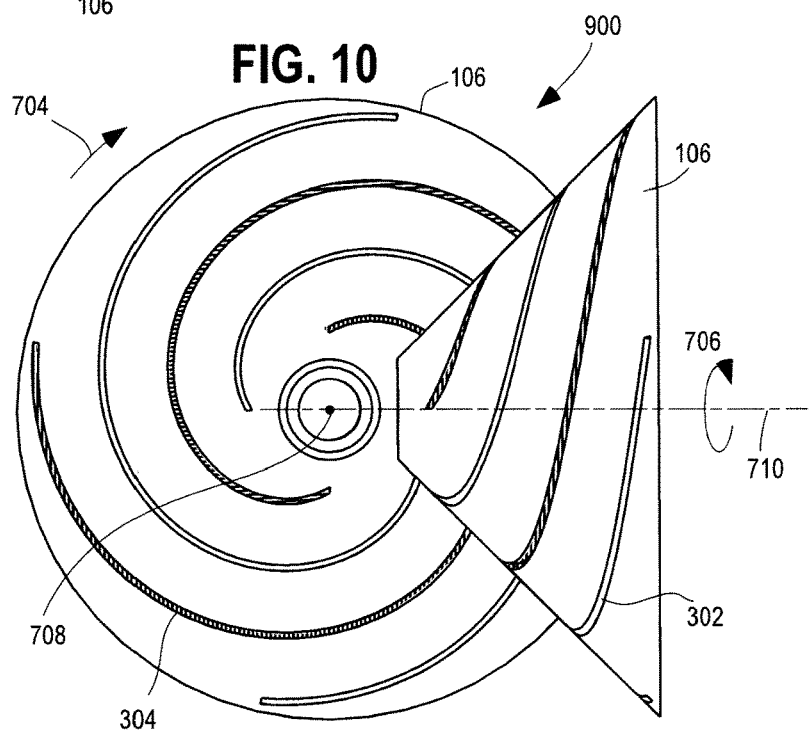
FIG. 10 is a top view of the second two-gear assembly.
Figure 11:
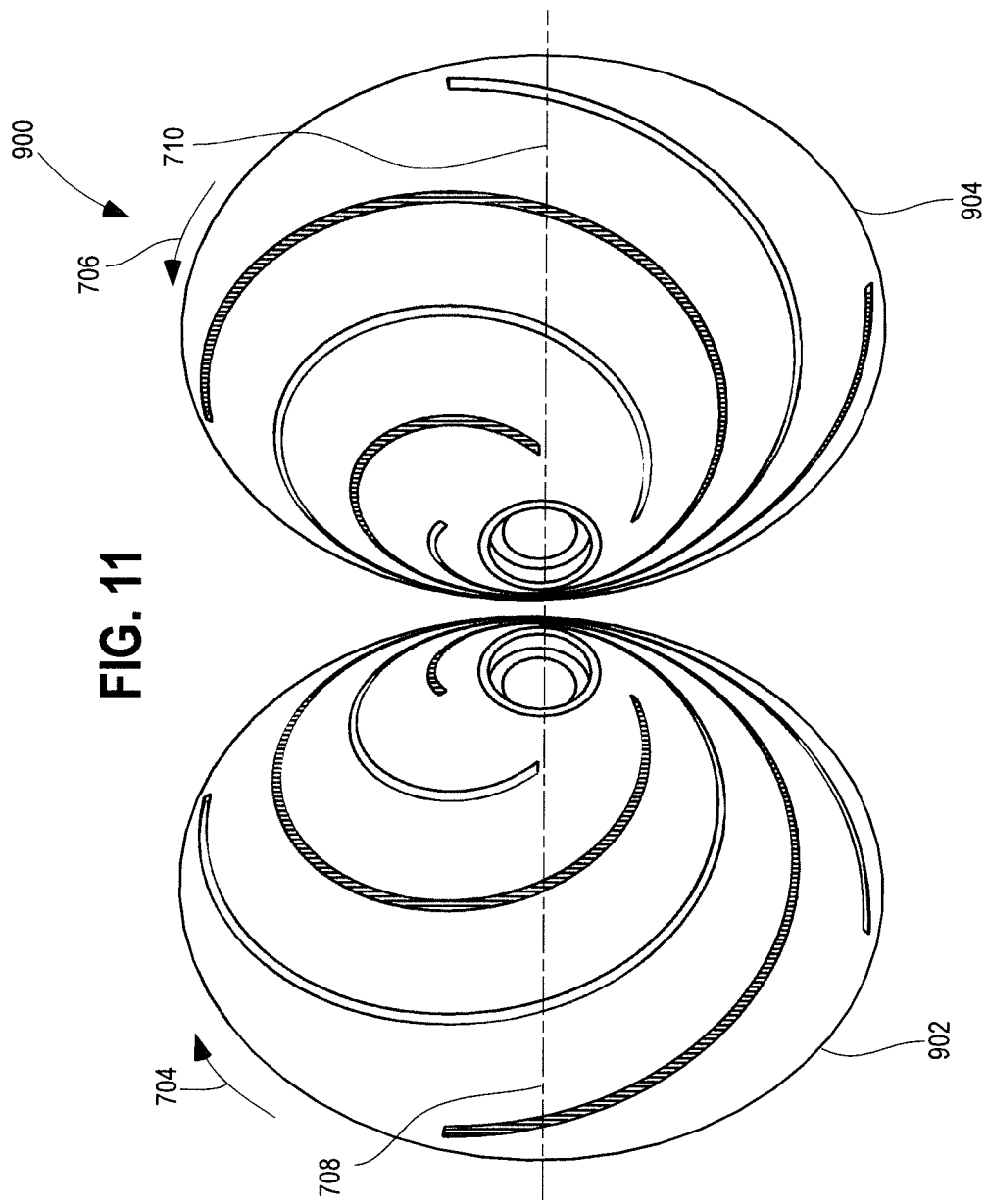
FIG. 11 is a perspective view of the second two-gear assembly.

Referring next to FIGS. 9-11, an elevational view, a top view, and an isometric view, respectively, of a second two-gear assembly 900 is shown in one embodiment of the present invention. Shown are two housings 106, the plurality of north-oriented strip magnets 302, the plurality of south-oriented strip magnets 304, a first continuous magnetic spiral bevel gear 902, a second continuous magnetic spiral bevel gear 904, the first gear rotational direction 704, the second gear rotational direction 706, the first gear rotational axis 708, and the second gear rotational axis 710.

In another embodiment, the second two-gear assembly 900 comprises two continuous magnetic spiral bevel gears 300. The second two-gear assembly 900 functions similarly to the first two-gear assembly 700, but comprises two continuous magnetic spiral bevel gears 300 including continuous strip magnets 302, 304 in lieu of the discrete magnets of the discrete magnetic spiral bevel gears 100. As shown in the isometric view of FIG. 11, the opposite direction of the magnetic spirals 118 is clearly shown. In the embodiment shown in FIGS. 9-11, the first continuous magnetic spiral bevel gear 902 is a clockwise gear, and the second continuous magnetic spiral bevel gear 904 is a counterclockwise gear. When the first continuous magnetic spiral bevel gear 902 is rotated in the clockwise first gear rotational direction 704, the magnetic interaction between the magnet of the first continuous magnetic spiral bevel gear 902 and the second continuous magnetic spiral bevel gear 904 will cause rotation of the second continuous gear 904 in the counterclockwise second gear rotation direction 706. The first continuous magnetic spiral bevel gear 902 may also be rotated in the opposite (counterclockwise direction), whereby the rotational directions of all gears is reversed.

Referring again to FIGS. 7-11, changing of a drive axis to a 90 degree or other degree rotational difference is provided by the two-gear magnetic spiral bevel gear assembly, various embodiments of which are illustrated in FIGS. 7-11. The two-gear assembly provides directional rotational change without complicated mechanisms. This changing of the drive axis is done through the interaction of one clockwise magnetic spiral bevel gear with one counterclockwise magnetic spiral bevel gear, producing a meshing of magnetic energy forces. This changing of drive axis arrangement is due to the non-contact magnetic field coupling where this magnetic spiral configuration provides a sequential polarity patterning of the positive and negative magnetic field to interact unobstructed along the magnetic spirals 118. The polarity patterning of the positive and negative magnetic forces interact as either repelling or attracting the adjacent magnetic spiral bevel gear as a closed circuit operation. The magnets only allow the magnetic fields to conform to the known magnetic laws of attraction or repulsion per positive or negative polarity relationship. The magnetic alternating-polarity spiral arrangement locks the opposing magnetic spirals 118 in a processional path along the frustoconical surface 116 of the housing 106 where the interacting magnetic spirals 118 must then conform to the magnetic spirals 118 of the adjacent magnetic spiral bevel gear or gears coming into interactive sequence as the driving gear rotates. The magnetic spiral 118 placement design allows for a variety of angle and shaft operation to be so configured. The angles shown herein are 45 degree angles, but other frustoconical slope angles may be used. Each magnetic spiral bevel gear in an assembly may have different slope angles depending on the desired rotational axis direction. The frustoconical shape of the housing 106 allows for different gear angles of operation, resolves misalignment problems, and further provides different plane of shaft placement for gear operation, i.e. each adjacent two-gear assembly changes the rotation 90 degrees in any direction. A three-gear assembly can be configured to change the drive axis 90 degrees in two separate planes. Additionally, the magnetic spiral bevel gears allow moving of the orientation of the rotational axis of one gear during rotational operation without disruption of the drive force due to the interactive arrangement of the magnetic fields providing a means for progression. Another advantage of the gearing assemblies disclosed herein is that it is scalable, from nano-system scales up to large complex arrangements.

Figure 12:
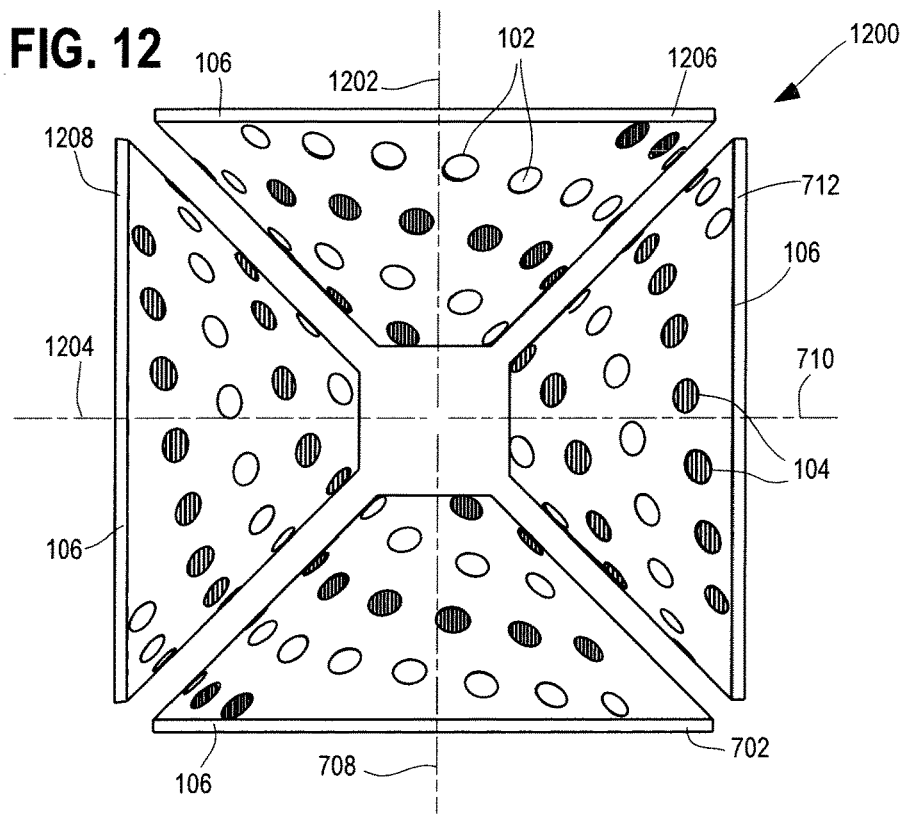
FIG. 12 is a front elevational view of a first four-gear assembly in yet another embodiment of the present invention.
Figure 13:
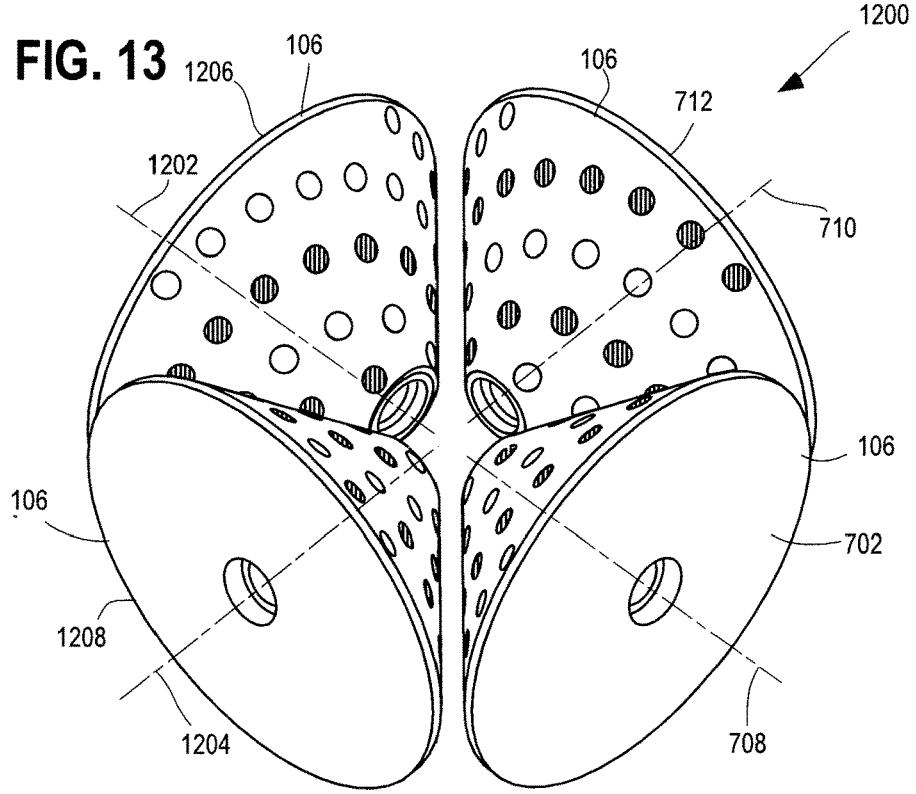
FIG. 13 is a perspective view of the first four-gear assembly.

Referring next to FIGS. 12-13, an elevational view and a perspective view, respectively, of an exemplary first four-gear assembly 1200 comprising four discrete magnetic spiral bevel gears is shown. Shown are four housings 106, the plurality of north-oriented discrete magnets 102, the plurality of south-oriented discrete magnets 104, the first discrete magnetic spiral bevel gear 702, the second discrete magnetic spiral bevel gear 712, a third discrete magnetic spiral bevel gear 1206, a fourth discrete magnetic spiral bevel gear 1208, the first gear rotational axis 708, the second gear rotational axis 710, a third gear rotational axis 1202, and a fourth gear rotational axis 1204.

As shown in FIGS. 12 and 13, the general configuration of the first four-gear assembly 1200 is similar to the two-gear configuration, with the addition of two additional gears, the third discrete magnetic spiral bevel gear 1206 and the fourth discrete magnetic spiral bevel gear 1208 such that all rotational axes 708, 710, 1202, 1204 are all in the same plane and the sloped frustoconical face 116 of each gear is parallel to each of the adjacent magnetic spiral bevel gears without touching any of the adjacent magnetic spiral bevel gears. In the embodiment shown in FIGS. 12 and 13, since the frustoconical surfaces 116 are sloped at 45 degrees, the rotational axes of opposing gears are coincident. As shown in FIGS. 12 and 13, two opposing first magnetic spiral bevel gears (the second discrete magnetic spiral bevel gear 712 and the fourth discrete magnetic spiral bevel gear 1208) include counterclockwise magnetic spirals 118, and the other two opposing gears (the first discrete magnetic spiral bevel gear 702 and the third discrete magnetic spiral bevel gear 1206) include clockwise magnetic spirals 118. It will be understood that other combinations of rotational directions of the gears may be used. In operation, as described previously, one of the magnetic spiral bevel gears of the four-gear assembly is rotated by an external force, whereby the magnetic interaction rotates the remaining three magnetic spiral bevel gears. The first four-gear assembly 1200 in one embodiment is used for power generation and storage when coupled with necessary flywheel and coil configurations.

Figure 14:
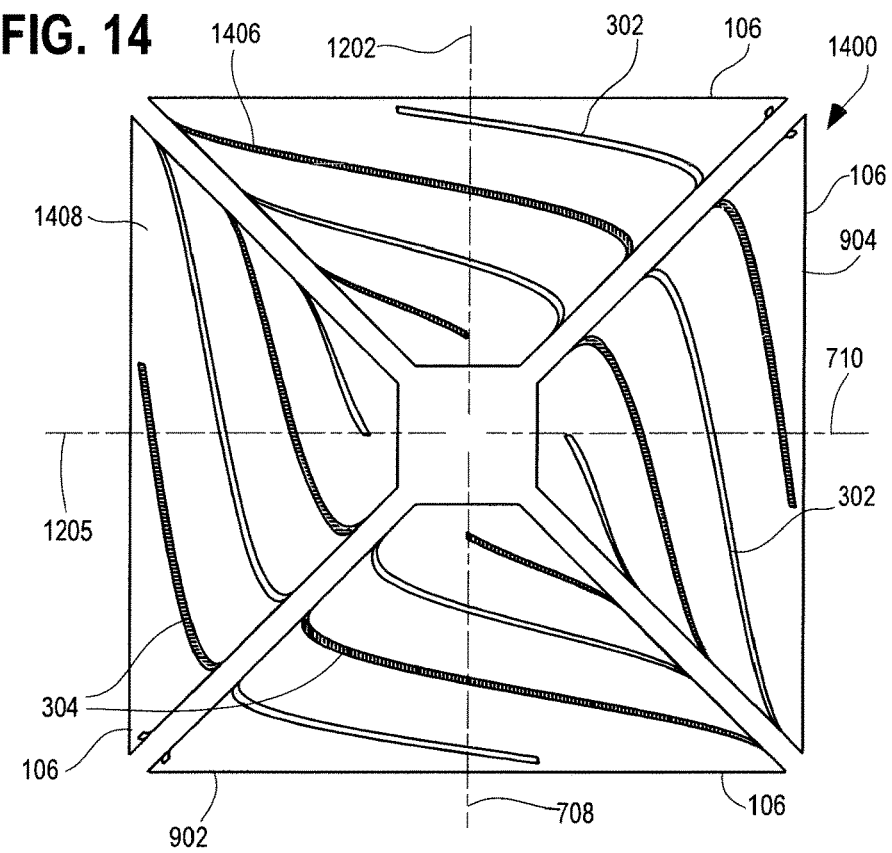
FIG. 14 is a front elevational view of a second two-gear assembly.
Figure 15:
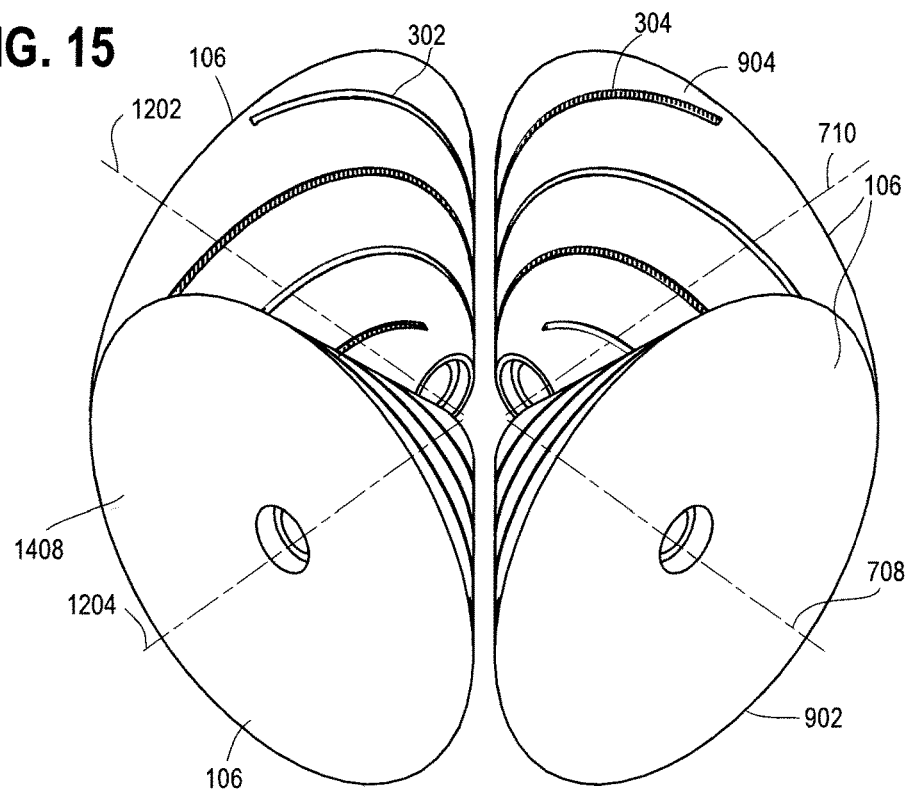
FIG. 15 is a perspective view of the second four-gear assembly.

Referring next to FIGS. 14 and 15, an elevational view and a perspective view, respectively, of an exemplary second four-gear assembly 1400 comprising four continuous magnetic spiral bevel gears is shown. Shown are four housings 106, the plurality of north-oriented strip magnets 302, the plurality of south-oriented strip magnets 304, the first continuous magnetic spiral bevel gear 902, the second continuous magnetic spiral bevel gear 904, the first gear rotational axis 708, the second gear rotational axis 710, a third continuous magnetic spiral bevel gear 1406, a fourth continuous magnetic spiral bevel gear 1408, the third gear rotational axis 1202, and the fourth gear rotational axis 1204.

The second four-gear assembly 1400 includes the four continuous magnetic spiral bevel gears 902, 904, 1406, 1408 including the continuous strip magnets 302, 304 in lieu of the discrete magnets 102, 104 of the first magnetic spiral bevel gear. The geometrical arrangement and function of the second four-gear assembly 1400 is the same as for the first four-gear assembly 1200.

Figure 16:
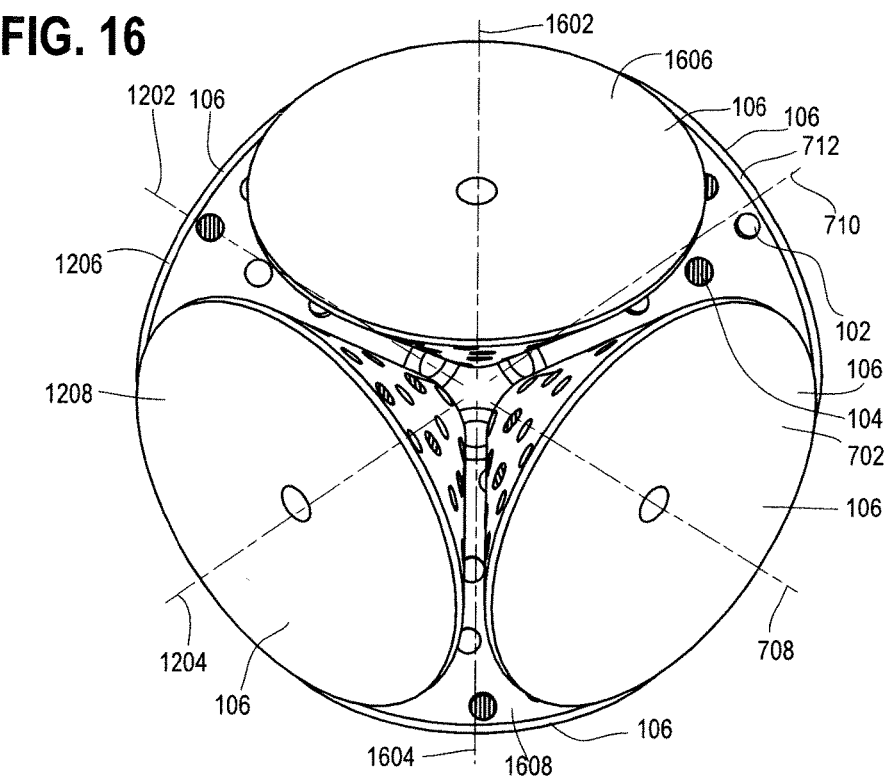
FIG. 16 is a perspective view of a first six-gear assembly in yet another embodiment of the present invention.
Figure 17:
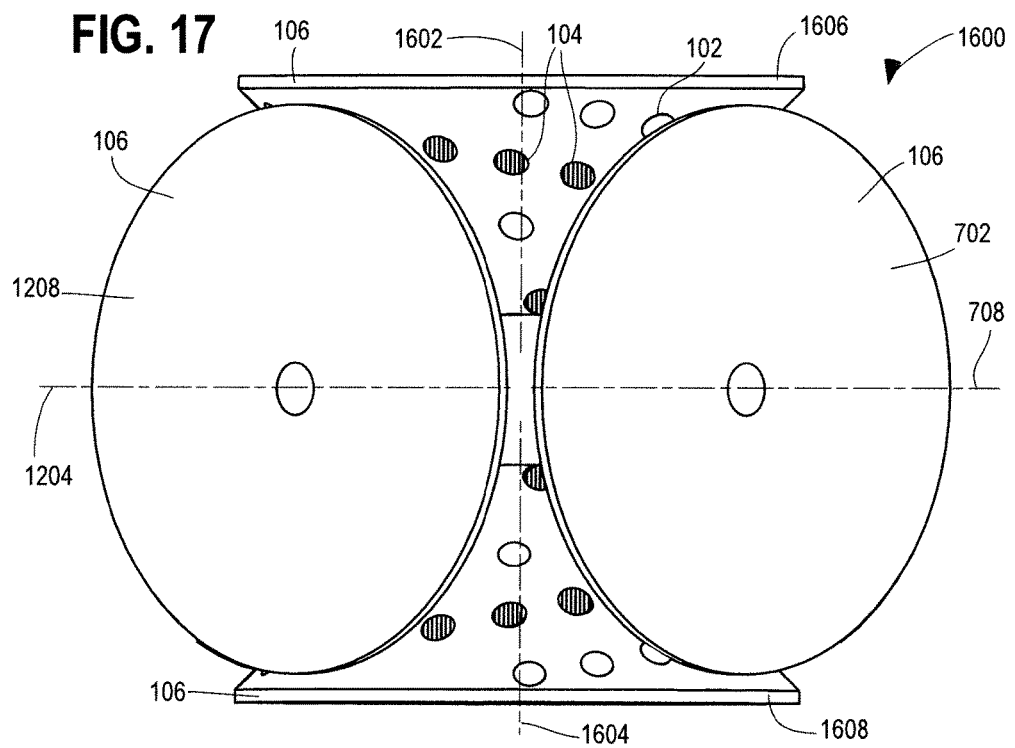
FIG. 17 is a front elevational view of the first six-gear assembly.
Figure 18:
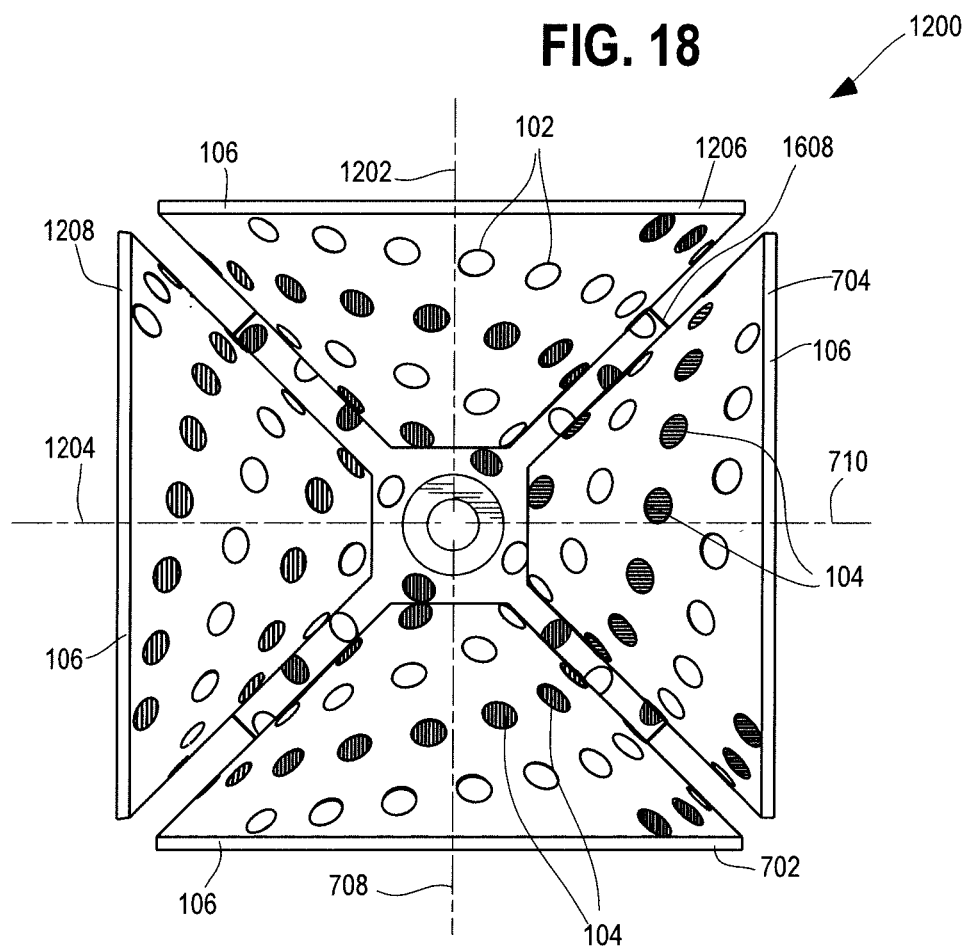
FIG. 18 is a top view of the first six-gear assembly.

Referring next to FIG. 16-18 a perspective view, an elevational view, and a top view, respectively, of an exemplary first six-gear assembly 1600 comprising six discrete magnetic spiral bevel gears is shown in one embodiment of the present invention. Shown are six housings 106, the plurality of north-oriented discrete magnets 102, the plurality of south-oriented discrete magnets 104, the first discrete magnetic spiral bevel gear 702, the second discrete magnetic spiral bevel gear 712, the third discrete magnetic spiral bevel gear 1206, the fourth discrete magnetic spiral bevel gear 1208, the first gear rotational axis 708, the second gear rotational axis 710, the third gear rotational axis 1202, the fourth gear rotational axis 1204, a fifth gear rotational axis 1602, a sixth gear rotational axis 1604, a fifth discrete magnetic spiral bevel gear 1606, and a sixth discrete magnetic spiral bevel gear 1608.

The first six-gear assembly 1600 is similar to the first four-gear assembly 1200, including the four discrete magnetic spiral bevel gears 702, 712, 1206, 1208, with discrete magnets 102, 104, arranged with rotational axes 708, 710, 1202, 1204 in a single plane, but the first six-gear assembly 1600 also includes an additional gear pair, the fifth discrete magnetic spiral bevel gear 1606 and the sixth discrete magnetic spiral bevel gear 1608, each with the rotational axis 1602, 1604 perpendicular to the rotational axes 708, 710, 1202, 1204 of the four gears are arranged in the four-gear assembly, and with all rotational axes 708, 710, 1202, 1204, 1602, 1604 intersecting at a center point. In FIG. 18, the fifth discrete magnetic spiral bevel gear 1606 is not shown in order to better illustrate the magnetic spiral 118 directions of the gears. In the exemplary first six-gear assembly 1600 shown, the four magnetic spiral bevel gears 708, 710, 1206, 1208 sharing a plane as shown in FIG. 18 include two counterclockwise gears and two clockwise gears. The fifth discrete magnetic spiral bevel gear 1606 (the top gear) is a counterclockwise gear and the sixth discrete magnetic spiral bevel gear 1608 (the bottom gear) is a clockwise gear. Both the fifth magnetic spiral bevel gear 1606 and the sixth magnetic spiral bevel gear 1608 can be interchanged with either clockwise or counterclockwise configuration, which will determine the direction of drive for each gear, respectively. In the preferred embodiment, the first six-gear assembly 1600 includes three counterclockwise gears and three clockwise gears.

Figure 19:
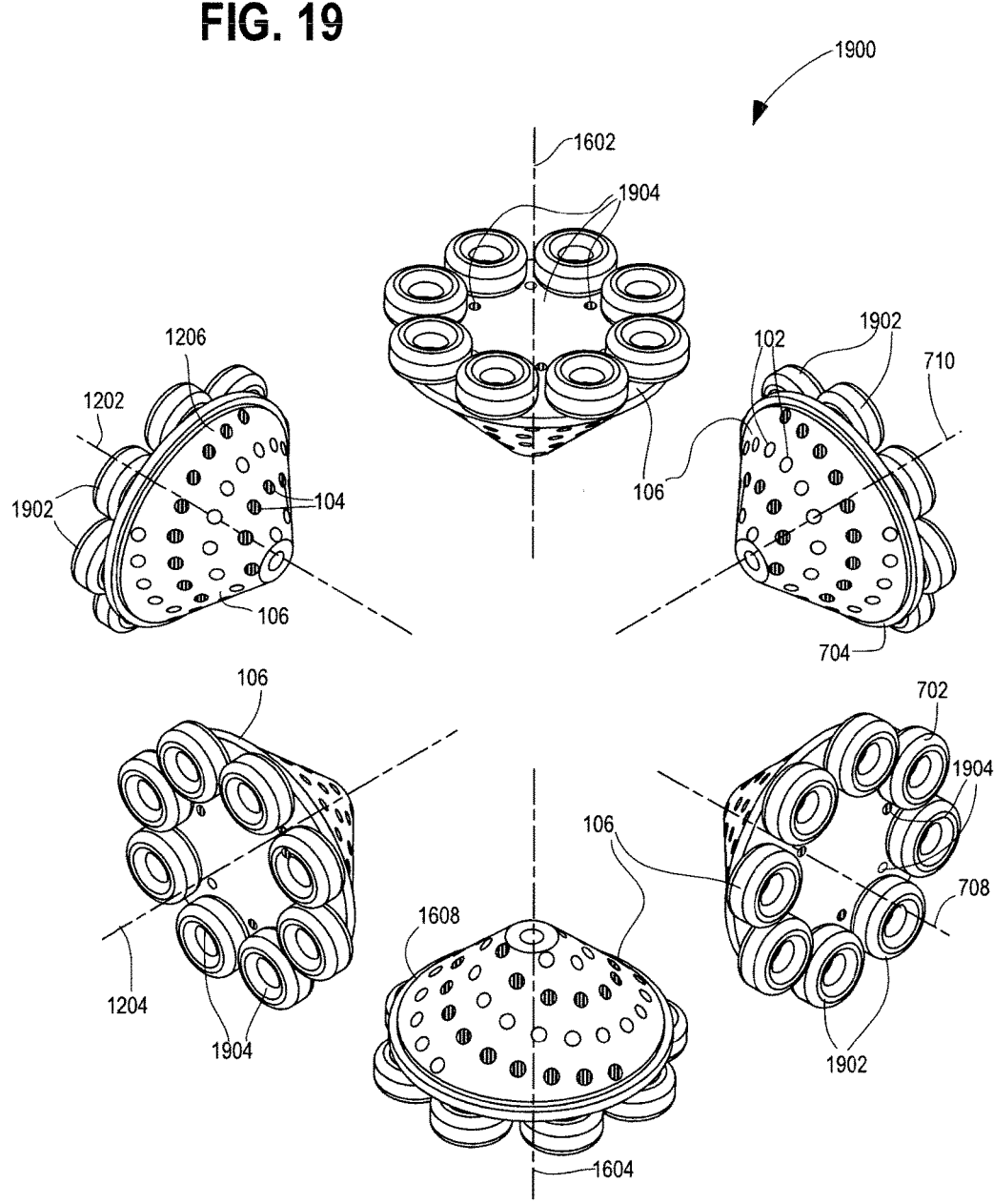
FIG. 19 is an exploded view of a second six-gear assembly.

Referring next to FIG. 19, an exploded view of a second six-gear assembly 1900 is shown. Shown are six housings 106, the plurality of north-oriented discrete magnets 102, the plurality of south-oriented discrete magnets 104, the first discrete magnetic spiral bevel gear 702, the second discrete magnetic spiral bevel gear 712, the third discrete magnetic spiral bevel gear 1206, the fourth discrete magnetic spiral bevel gear 1208, the first gear rotational axis 708, the second gear rotational axis 710, the third gear rotational axis 1202, the fourth gear rotational axis 1204, the fifth gear rotational axis 1602, the sixth gear rotational axis 1604, the fifth discrete magnetic spiral bevel gear 1606, the sixth discrete magnetic spiral bevel gear 1608, a plurality of electromagnetic coils 1902, and a plurality of flywheel magnets 1904.

The exemplary second six-gear assembly 1900 is similar to the first six-gear assembly 1600, with the addition of the plurality of flywheel magnets 1904 coupled to the bottom surface 200. The flywheel magnets 1904 are arranged in a circular pattern concentric to the rotational axis 108, with alternating polarities. Also shown are the plurality of electromagnetic coils 1902. The electromagnetic coils 1902 are not mechanically coupled to the proximate gear, but are supported by a chassis or other support (not shown for clarity). The electromagnetic coils 1902 interact magnetically with the flywheel magnets 1904. The interaction between the electromagnetic coils 1902 and the flywheel magnets 1904 is commonly known in the art: typically in a generator option the flywheel magnets 1904 are rotated, allowing the electromagnetic coils 1902 to pick up the changing magnetic flux path. In a motor embodiment, the electromagnetic coils 1902 are pulsed, causing the flywheel magnets 1904 to rotate, thus rotating the gear. It will be understood that the design of the electromagnetic coils 1902 and flywheel magnets 1904 (size, quantity, strength, etc.) will be known to those of ordinary skill in the art. In some embodiments the flywheel magnets 1904 may be coupled to other portions of the magnetic spiral bevel gear, for example coupled to the outer surface of the collar 202. The electromagnetic coils 1902 may be electrically coupled to a battery (or other means to store energy) or a power source to induce electrical charge in the electromagnetic coils 1902.

The electromagnetic coils 1902 magnetically coupled to the flywheel magnets 1904 of the magnetic spiral bevel gears 702, 712, 1206, 1208, 1606, 1608, can be used as part of an electrical generator assembly to generate electrical power when that gear is turned, or as pulse coils to drive an output. When used as a generator, the AC current produced by the flywheel magnet 1904 interactions with the electromagnetic coils 1902 can be transformed to DC current using means commonly known in the art and stored in a battery or capacitor, or the AC current may be used directly.

Figure 20:
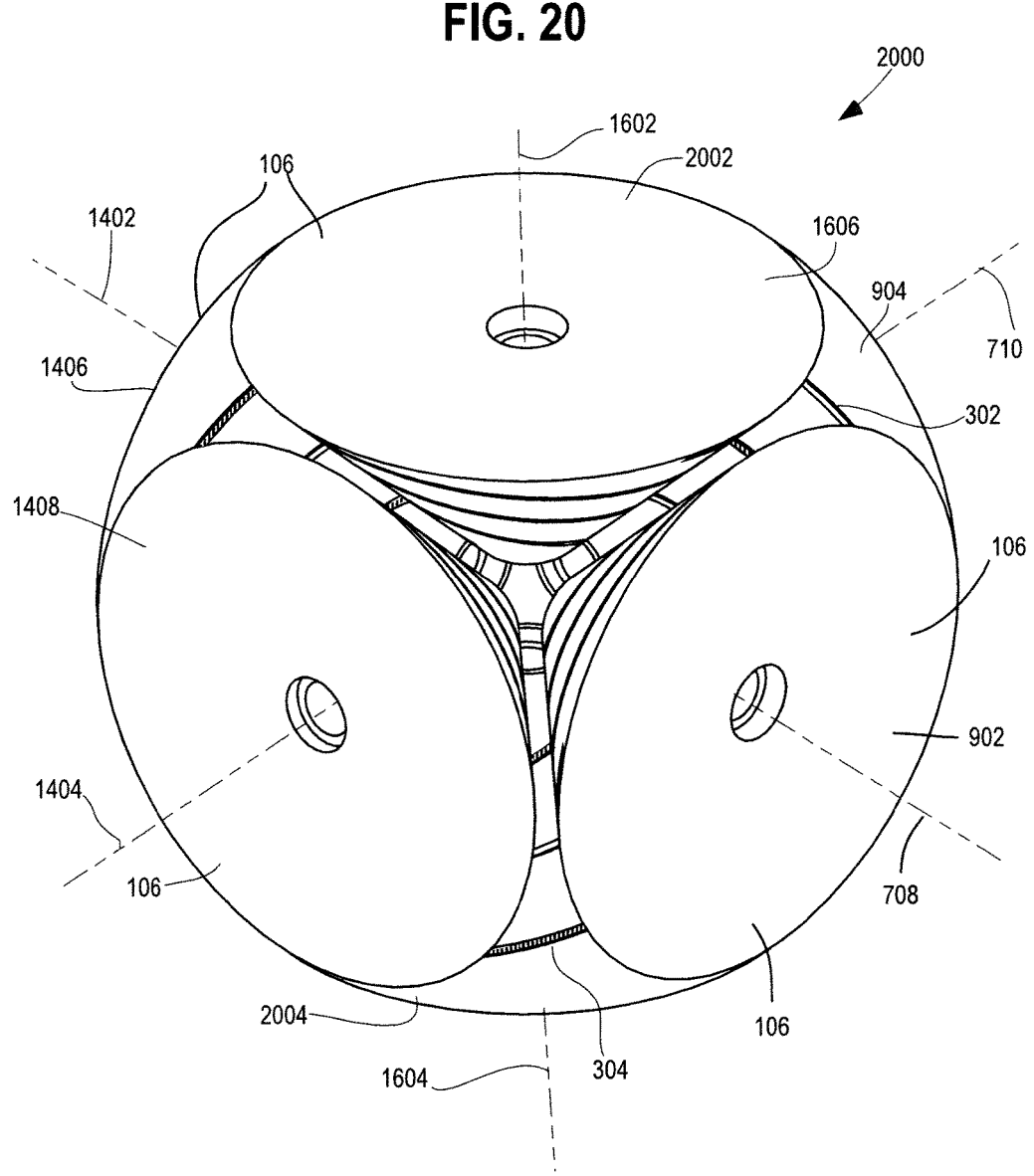
FIG. 20 is a perspective view of a third six-gear assembly in yet another embodiment of the present invention.
Figure 21:
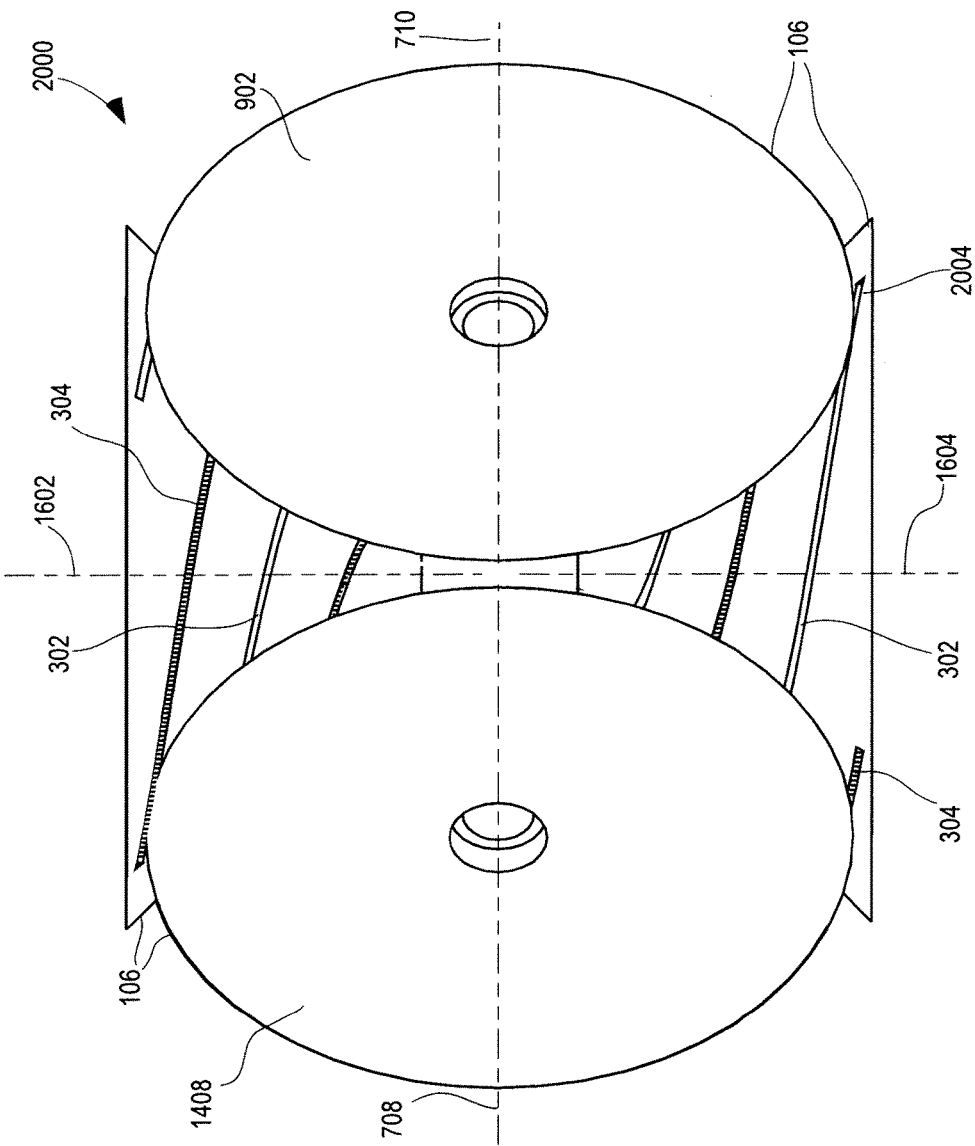
FIG. 21 is a front elevational view of the third six-gear assembly.
Figure 22:
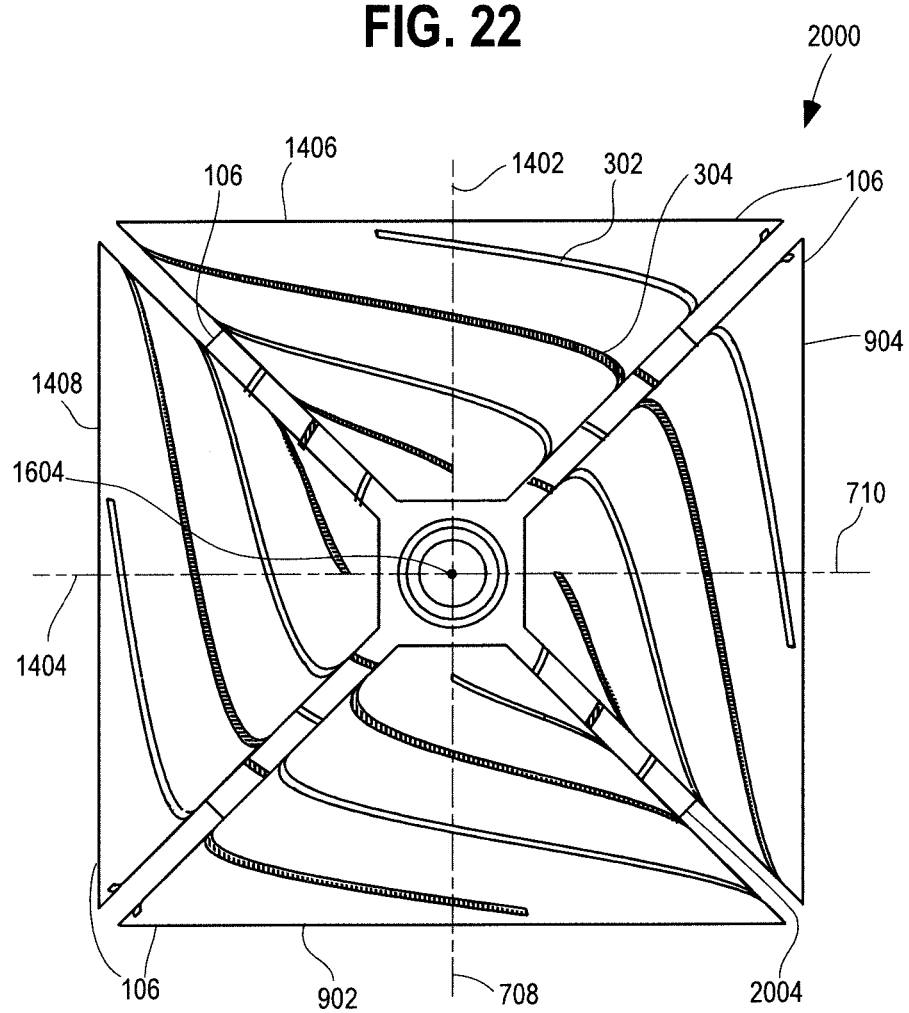
FIG. 22 is a top view of the third six-gear assembly.

Referring next to FIGS. 20-22, a perspective view, an elevational view, and a top view, respectively, of an exemplary third six-gear assembly 2000 comprising six continuous magnetic spiral bevel gears 300 is shown in one embodiment of the present invention. Shown are six housings 106, the plurality of north-oriented strip magnets 302, the plurality of south-oriented strip magnets 304, the first continuous magnetic spiral bevel gear 902, the second continuous magnetic spiral bevel gear 904, the third continuous magnetic spiral bevel gear 1406, a fourth continuous magnetic spiral bevel gear 1408, the first gear rotational axis 708, the second gear rotational axis 710, the third gear rotational axis 1202, the fourth gear rotational axis 1204, the fifth gear rotational axis 1602, the sixth gear rotational axis 1604, a fifth continuous magnetic spiral bevel gear 2002, and a sixth continuous magnetic spiral bevel gear 2004. The fifth continuous magnetic spiral bevel gear 2002 is not shown in of FIG. 22 is not shown in order to better illustrate the magnetic spiral directions of the gears.

The third six-gear assembly 2000 is similar to the first six-gear assembly 1600, with the exception that the third six-gear assembly 2000 includes continuous magnetic spiral bevel gears in lieu of discrete magnetic spiral bevel gears.

Referring again to FIGS. 16-22, the six-gear assemblies allow for changing of the axis drive and/or the rotational direction by changing the magnetic spiral 118 directions of the top and bottom gears. The six-gear assembly may also be used for driveline breakaway and torque transfer through a sealed chamber (as described further below in FIG. 25).

Additionally, for the six-gear assemblies with same-axis gear pairs rotating in opposite direction gyroscopic effects are neutralized, providing an advantageous gearing system for vehicles and other moving systems where gyroscopic effects are undesirable. For example, the six-gear assembly can be used as a flywheel in an electric vehicle to store energy without detrimental gyroscopic effects on the vehicle.

Other benefits of the six-gear assembly include over-rpm breakaway torque, wherein the over-rpm breakaway torque is an overload torque value causing the overloaded gear to slip with respect to the other magnetic gears, thereby "breaking away" from the other gears. The over-rpm breakaway value would be dependent on the strength and configuration of the magnetic spirals 118 and the distance between adjacent gears. If one of the gears breaks away from the remainder of the gears, the gear system may be slowed to allow the magnetic couplings with the broken-away gear to re-establish. Then the speed six-gear assembly (or other assembly) is increased to the previous, or other desired, speed. This ability for one magnetic spiral bevel gear to "break away" from the remainder of the assembly is advantageous as it can prevent shattering or other damage to a shaft or gear.

The six-gear assembly also has high tolerance for misalignment of the six-gear assembly. The six-gear assembly may be used as an operational connecting link between the direct drive of a wind generator to an alternator/generator without massive mechanical gearing. In space, the magnetic non-contact coupling, with no lubrication requirements, would be advantageous in satellites, or other spacecraft. Also, the six-gear assembly is more compact than traditional gearing systems.

Yet another advantage of the six-gear assembly is that one magnetic spiral bevel gear included in the six-gear assembly may be stopped while the remainder of the magnetic spiral bevel gears remain in rotation, without affecting the other magnetic spiral bevel gears. The six-gear assembly may then be slowed to a re-coupling speed, whereby slowing to the re-coupling speed allows the stopped gear to re-couple with the rotating magnetic gears, whereby the stopped magnetic gear resumes rotation in sync with the remainder of the magnetic gears.

Figure 23:
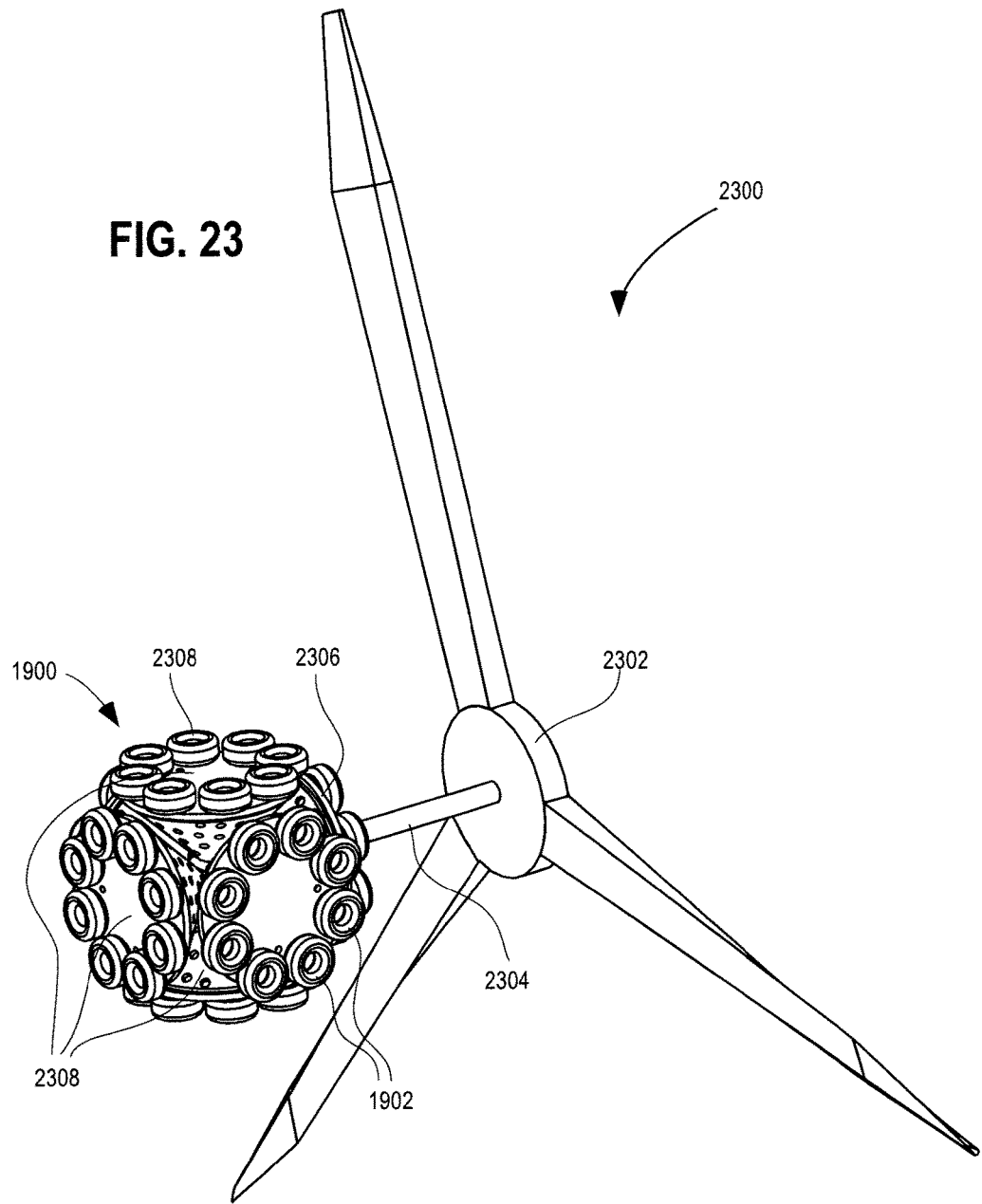
FIG. 23 is a perspective view of an exemplary wind turbine assembly in accordance with yet another embodiment of the present invention.

Referring next to FIG. 23, a perspective view of an exemplary wind turbine assembly 2300 is shown. Shown are the second six-gear assembly 1900, the plurality of electromagnetic coils 1902, a rotor 2302, a drive shaft 2304, a drive magnetic spiral bevel gear 2306, and a plurality of generator magnetic spiral bevel gears 2308.

In one application of an assembly including at least one six-gear assembly, the second six-gear assembly 1900 is shown coupled to the drive shaft 2304 and the rotor 2302 of a wind turbine assembly 2300 whereby the rotation of the rotor 2302 results in rotation of the drive magnetic spiral bevel gear 2306 about the rotational axis of the drive magnetic spiral bevel gear 2306. While the second six-gear assembly 1900 is shown, it will be understood that any embodiment of six-gear assemblies may be used, and in other embodiments four-gear or two-gear assemblies may be used.

In operation, blades of the rotor 2302 are rotated by wind forces, whereby the drive shaft 2304 coupled to a rotational axis of the rotor 2302 is rotated around a longitudinal axis of the drive shaft 2304. A distal end of the drive shaft 2304 is coupled to the drive magnetic spiral bevel gear 2306 of the second six-gear assembly 1900 such that the rotation of the drive shaft 2304 causes rotation of the drive magnetic spiral bevel gear 2306 around the rotational axis of the drive magnetic spiral bevel gear 2306. As previously described, the rotation of one of the magnetic spiral bevel gears (in this case the drive magnetic spiral bevel gear 2306) causes rotation of the other magnetic gears in the assembly (here termed the generator magnetic spiral bevel gears 2308) due to the magnetic interaction of the magnets on the magnetic spiral bevel gear frustoconical surfaces 116. The rotation of the generator magnetic spiral bevel gears 2308, and thus the flywheel magnets 1904 previously described in FIG. 19, then induces magnetic flux in the proximate electromagnetic coils 1902. In other embodiments the generator magnetic spiral bevel gears 2308 may be coupled to one or more mechanical gears, other electrical generation components, one or more flywheels, or any other methods for energy transfer. Other applications include embodiments where a transfer of rotational direction is required. In one exemplary embodiment one six-gear assembly could be coupled to each other through a shaft, doubling the rotational change, as may be desired for some forms of conveyor systems.

Figure 24:
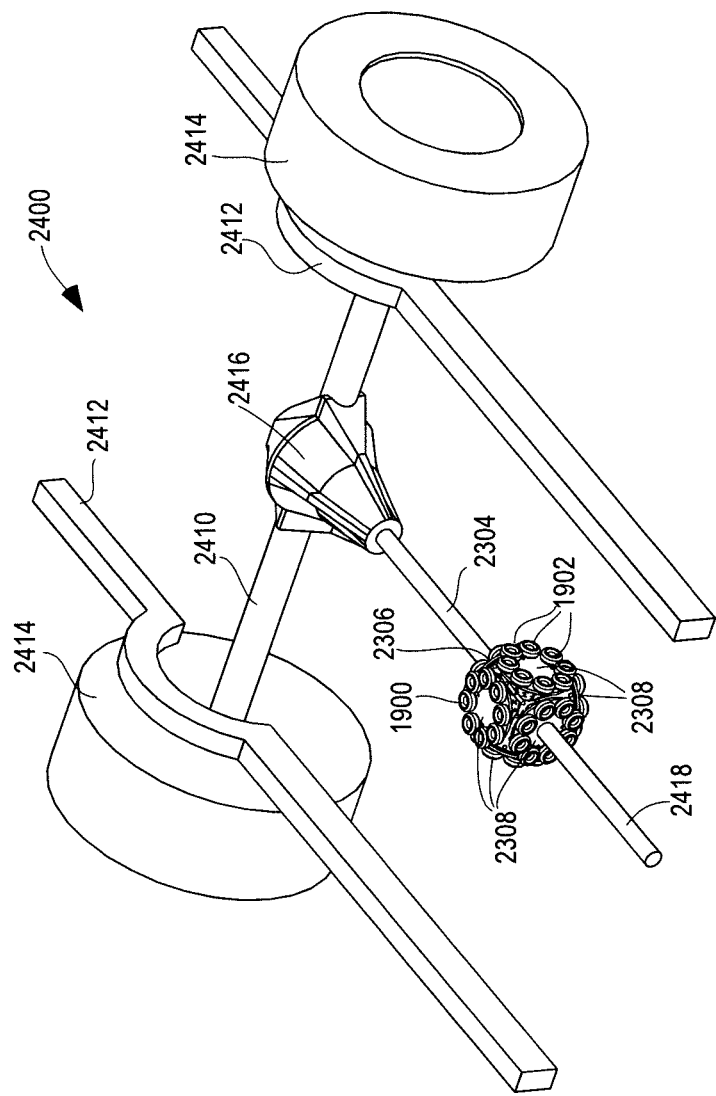
FIG. 24 is a perspective view of an exemplary vehicle drivetrain in accordance with yet another embodiment of the present invention.

Referring next to FIG. 24, a perspective view of an exemplary vehicle drivetrain is shown. Shown are the second six-gear assembly 1900, the plurality of electromagnetic coils 1902, the drive shaft 2304, the drive magnetic spiral bevel gear 2306, the plurality of generator magnetic spiral bevel gears 2308, a second shaft 2418, a differential 2416, an axle 2410, a portion of a chassis 2412, and two vehicle wheels 2414.

In the embodiment shown in FIG. 24, the second six-gear assembly 1900 (or other suitable magnetic spiral bevel gear assembly) is powered by the rotation of the vehicle wheels 2414. As is known in the art, the axle 2410 is juxtaposed between the wheels 2414. The drive shaft 2304 is rotationally coupled to the axle 2410 via the differential 2416. When the wheels 2414 rotate during movement of the vehicle, the axle 2410 is rotated around a longitudinal axis of the axle 2410. As with the exemplary wind turbine assembly 2300, the drive shaft 2304 is coupled to the drive magnetic spiral bevel gear 2306, whereby rotation of the drive shaft 2304 rotates the drive magnetic spiral bevel gear 2306 around the rotational axis of the drive magnetic spiral bevel gear 2306, whereby the generator magnetic spiral bevel gears 2308 are rotated. In the embodiment shown, the second shaft 2418 coupled to one of the generator magnetic spiral bevel gears 2308 is also rotated. It should be noted that each magnetic spiral bevel gear 2306, 2308 is supported by an independent rotational axis, i.e. gear pairs that share one rotational axis are allowed to rotate in opposite directions.

The rotation of the drive magnetic spiral bevel gears 2308 may be used to store energy by acting as a flywheel. In other embodiments the second six-gear assembly 1900 acts as a brake assist by switching the polarity of the electromagnetic coils 1902 to a shorted position, whereby the forward movement of the gear is stopped. In some embodiments the six-gear assembly. In other embodiments, the second six-gear assembly 1900 assists acceleration by using the electromagnetic coils 1902 as pulse coils. In other embodiments a four-gear assembly is used in the drivetrain. As previously described the six-gear assembly with gear pairs rotating in opposite directions neutralize the gyroscopic effect, which is advantageous when installed in vehicles as gyroscopic effects in vehicles are undesirable as they can interfere with the steering of the vehicle. It will be understood that while six-gear assemblies are referred to, other magnetic spiral bevel gear assemblies may be used if the assembly is suitable for the required function(s).

Figure 25:
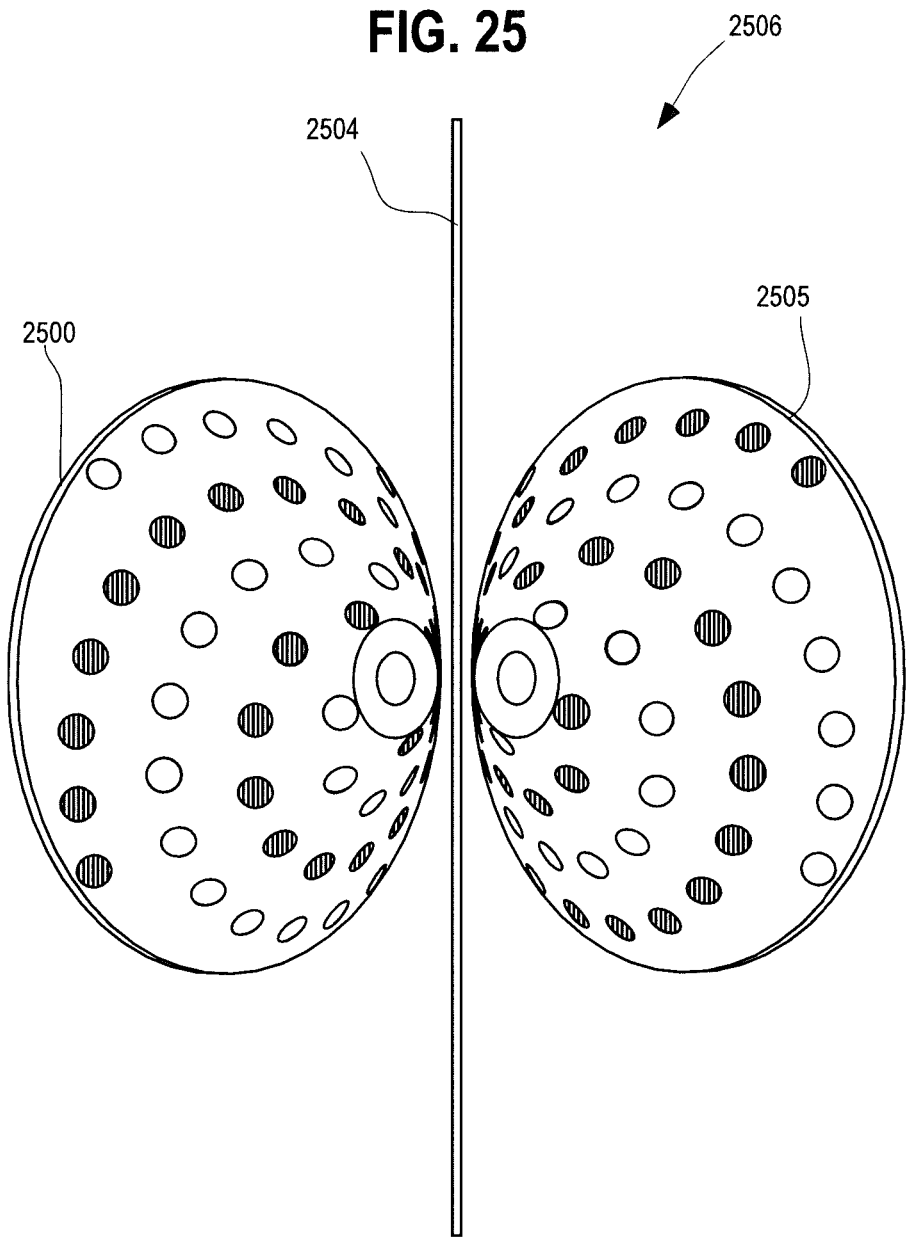
FIG. 25 is a perspective view of an exemplary barrier two-gear assembly separated by a barrier in accordance with yet another embodiment of the present invention.

Referring next to FIG. 25, a front elevational view of an exemplary barrier two-gear assembly 2506 separated by a barrier 2504 is shown. Shown are a first barrier magnetic spiral bevel gear 2500, a second barrier magnetic spiral bevel gear 2502, and the barrier 2504.

The exemplary barrier two-gear assembly 2506 comprising the first barrier magnetic spiral bevel gear 2500 and the second barrier magnetic spiral bevel gear 2502 is arranged similarly to the two-gear assemblies previously described, i.e. with the rotational axes of the barrier magnetic spiral bevel gears 2500, 2502 at a perpendicular angle and the sloped surfaces 116 parallel. Discrete magnetic spiral bevel gears 100 are shown, but continuous magnetic spiral bevel gears 300 could also be used. The discrete magnets 102, 104 shown are disc magnets, but magnets of various sizes and shaped may be used as long as the magnets comprising the magnetic spiral 118 are of sufficient size, shape, strength and spacing to provide the required magnetic field for proper operation of the gearing system. Rotational support shafts of the barrier magnetic spiral bevel gears 2500, 2502 are not shown for clarity.

The non-ferrous barrier 2504 is interposed between the first barrier magnetic spiral bevel gear 2500 and the second barrier magnetic spiral bevel gear 2502 and separates the two barrier magnetic spiral bevel gears 2500, 2502 from contacting each other without touching either barrier magnetic spiral bevel gear 2500, 2502. As the barrier 2504 is non-ferrous, the barrier 2504 also does not interfere with the discrete magnets 102, 104. As a result, rotation of the first barrier magnetic spiral bevel gear 2500 results in rotation of the second barrier magnetic spiral bevel gear 2502 (or vice versa), even though the barrier magnetic spiral bevel gears 2500, 2502 have no mechanical contact. As such, the barrier two-gear assembly 2506 transmits torque through the physical barrier 2504. As a result, magnetic spiral bevel gear assemblies can operate in sealed chambers or through other separations. For example, any magnetic spiral bevel gear assembly could be used in a system which requires separation of chemicals, differences in pressure, or isolation of elements such as in sanitary chambers in a food or pharmaceutical environment, or any use which requires physical separation of gears.

While the invention herein disclosed has been described by means of specific embodiments, examples and applications thereof, numerous modifications and variations could be made thereto by those skilled in the art without departing from the scope of the invention set forth in the claims.

What is claimed is:

1. A magnetic gear comprising:
a housing having a frustoconical shape, wherein an outer side surface of the frustoconical-shaped housing has a constant slope, the housing having a rotational axis coinciding with a longitudinal axis of the frustoconical-shaped housing;
at least one north-oriented magnetic spiral coupled to the frustoconical-shaped housing, each north-oriented magnetic spiral comprising at least one magnet with a north pole facing generally outwards from the side surface, wherein each north-oriented magnetic spiral follows a spiral path on the side surface, wherein each spiral path starts at a start point located at a first radius from the rotational axis and proximate to a top of the frustoconical-shaped housing and continues in a spiral geometry on the side surface until an end point location at a second radius from the rotational axis and proximate to a base of the frustoconical-shaped housing; and at least one south-oriented magnetic spiral coupled to the frustoconical-shaped housing, each south-oriented magnetic spiral comprising at least one magnet with a south pole facing generally outwards from the side surface, wherein each south-oriented magnetic spiral follows the spiral path on the side surface, wherein the at least one north-oriented magnetic spiral and the at least one south-oriented magnetic spiral are equally spaced with respect to a perimeter of the frustoconical-shaped housing, wherein the magnetic spirals alternate between north-oriented magnetic spirals and south-oriented magnetic spirals, wherein the north-oriented magnetic spirals and the south-oriented magnetic spirals do not touch, and wherein a total number of the magnetic spirals is an even number.

2. The magnetic gear of claim 1 wherein the at least one magnet is a plurality of disc magnets.

3. The magnetic gear of claim 2 wherein the disc magnets are equally spaced along each magnetic spiral.

4. The magnetic gear of claim 1 wherein each magnetic spiral comprises a single magnet.

5. The magnetic gear of claim 1, wherein the housing further comprises a central bore for receiving a shaft.

6. The magnetic gear of claim 1, wherein each magnetic spiral is oriented clockwise.

7. The magnetic gear of claim 1, wherein each magnetic spiral is oriented counterclockwise.

8. The magnetic gear of claim 1, wherein each magnetic pole is oriented perpendicular to the side surface.

9. The magnetic gear of claim 1, wherein an outer surface of each magnet is generally aligned with the side surface.

10. The magnetic gear of claim 1, wherein the magnets are embedded in the housing.

11. The magnetic gear of claim 1, wherein the magnets extend past the side surface.

12. The magnetic gear of claim 1, wherein the spiral geometry is a fractal spiral geometry.

13. The magnetic gear of claim 1, wherein the spiral geometry is a square root spiral geometry.

* * * * *